United States Patent [19]

Fukuda et al.

[11] 3,991,265
[45] Nov. 9, 1976

[54] SIGNAL EDITING AND PROCESSING APPARATUS

[75] Inventors: Masaaki Fukuda; Tatsuo Kayano; Takashi Uehara, all of Tokyo; Takehiko Yoshino, Yokohama; Eiichi Sawabe; Hisakichi Yamane, both of Tokyo; Akio Yanagimachi, Kawasaki; Teruhiro Takezawa; Michio Masuda, both of Tokyo; Hiroaki Nabeyama, Yokohama, all of Japan

[73] Assignees: Hitachi Electronics, Ltd.; Hitachi, Ltd.; Nippon Hoso Kyokai, all of Tokyo, Japan

[22] Filed: May 17, 1974

[21] Appl. No.: 470,865

[30] Foreign Application Priority Data

May 23, 1973 Japan.............................. 48-56858
May 23, 1973 Japan.............................. 48-56859

[52] U.S. Cl. ........................ 178/5.6; 178/DIG. 23
[51] Int. Cl.² ........................................ H04N 5/00
[58] Field of Search .......... 178/5.6, 6.6 DD, 6.6 SF, 178/DIG. 23, 5.8 R; 179/15 A, 15 BY

[56] References Cited
UNITED STATES PATENTS 3,740,463  6/1973  Youngstrom et al. ........... 178/5.6 X
3,748,381  7/1973  Strobele et al. ............. 178/6.6 SF X
3,789,137  1/1974  Newell ........................... 178/5.6 X
3,800,290  3/1974  Croxon .......................... 179/15 A X

*Primary Examiner*—Robert L. Griffin
*Assistant Examiner*—Mitchell Saffian
*Attorney, Agent, or Firm*—Stevens, Davis, Miller & Mosher

[57] ABSTRACT

A signal editing and processing technique for converting a plurality of continuous signals, especially long term continuous audio signals respectively relating to short term still picture signals, to a transmitting signal in which signal transmission periods and pause periods are provided, having an integer ratio of time duration with each other, wherein other signals, especially the picture signals, should be transmitted. All continuous signals are sequentially converted to digital signals addressed in accordance with relevant continuous signals, and once stored in arbitrary positions of a memory, and then read out in a given multiplexed sequence corresponding to the transmission periods of the transmitting signal. The read out multiplexed digital signals are sequentially stored in another memory, and then read out with a given high speed equal to that of the signal transmission. The digital signals read out with the high speed are stored in still another memory, and then read out repeatedly to form the transmitting signal.

10 Claims, 22 Drawing Figures

FIG_1
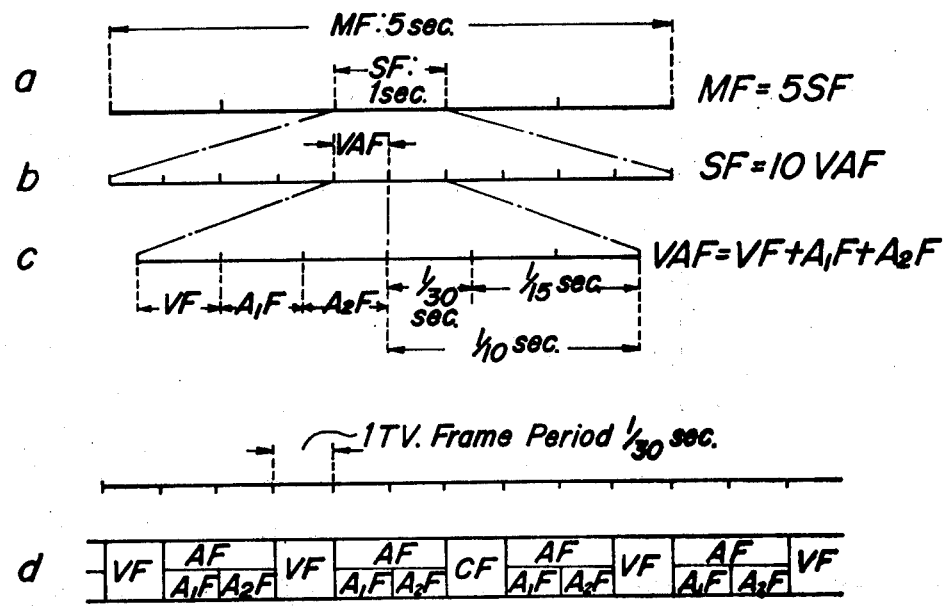
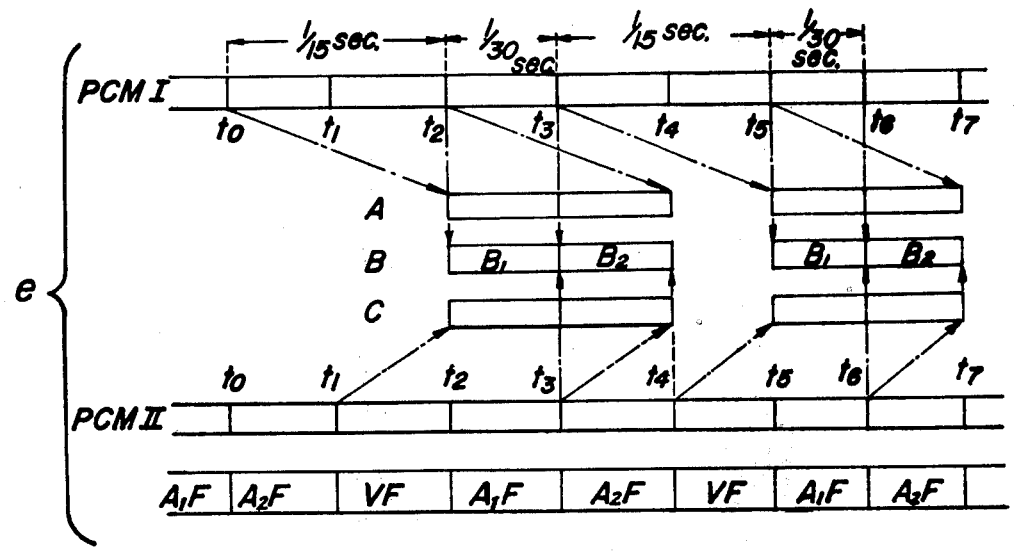

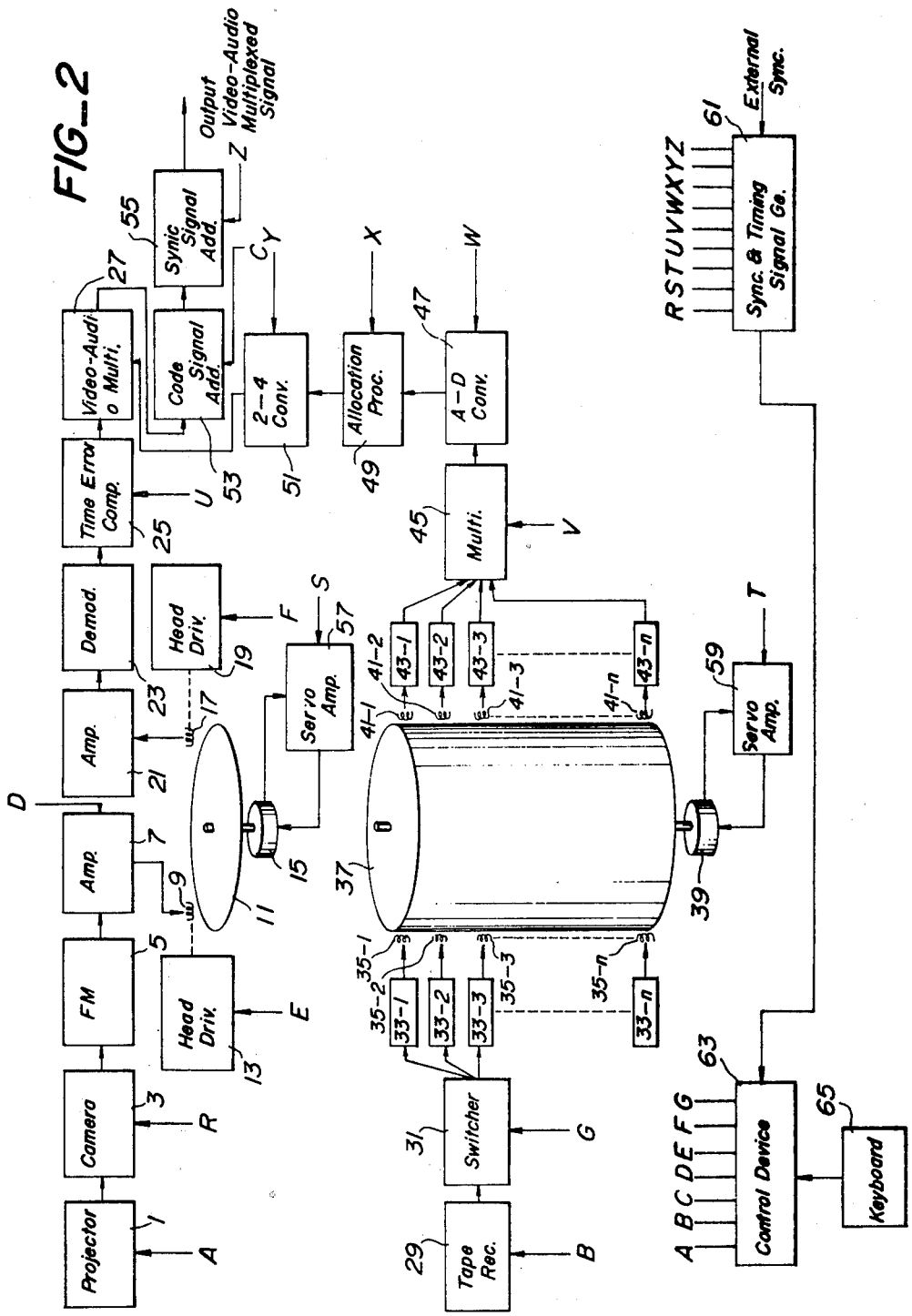

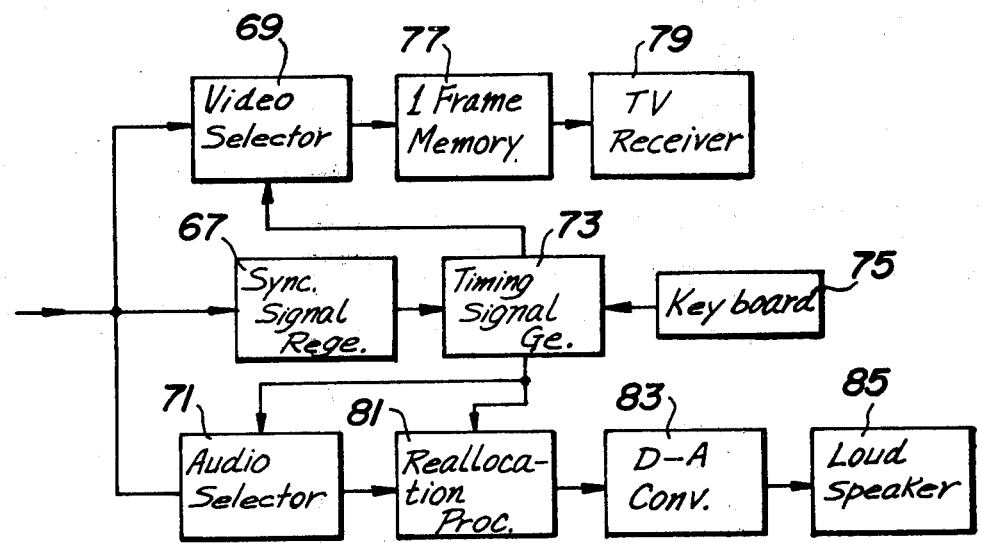
FIG_3

FIG_4
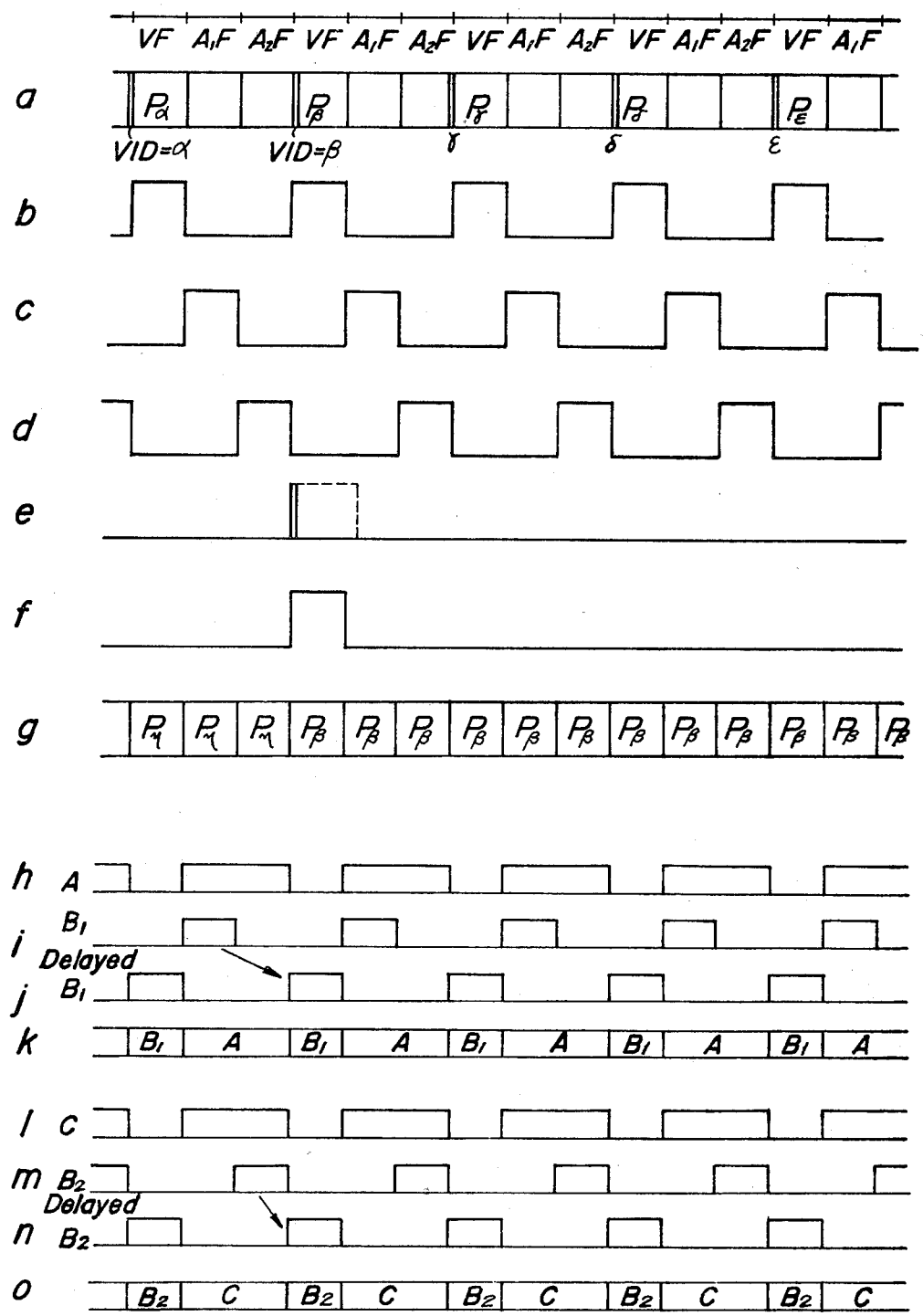

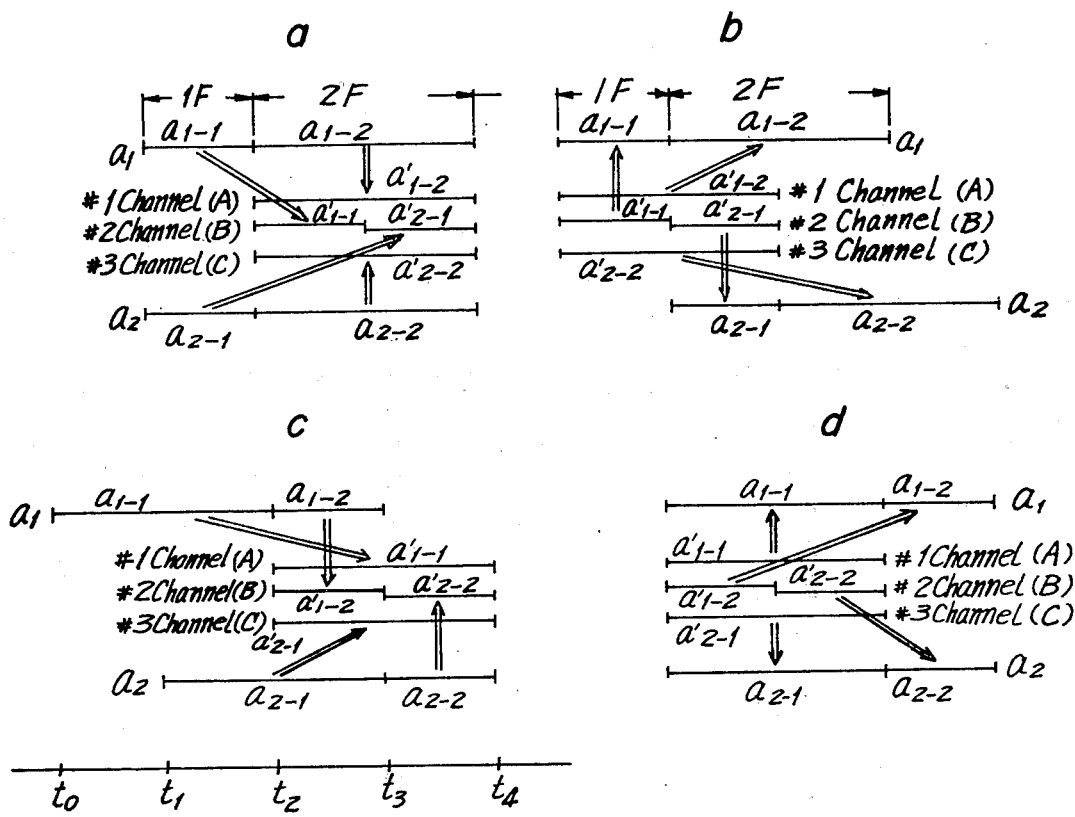

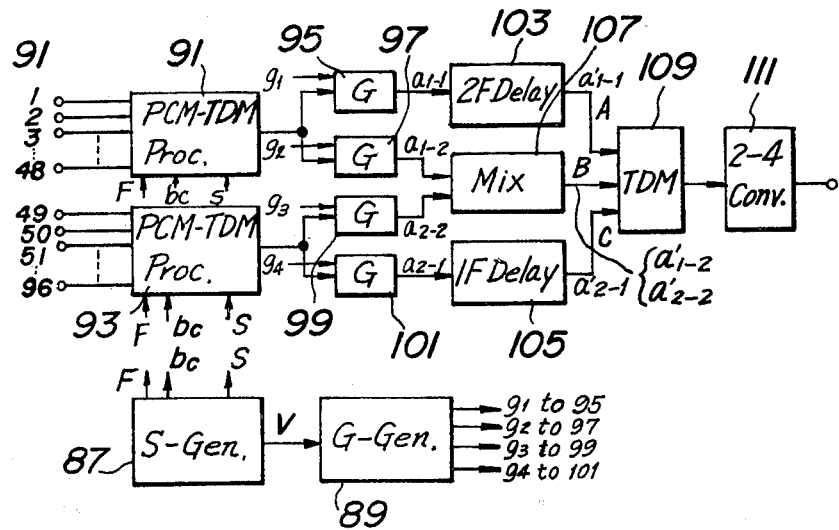
FIG_6
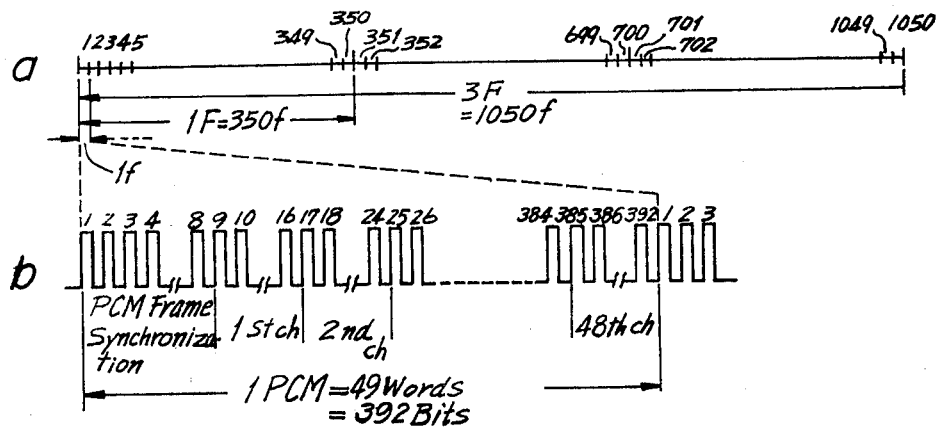
FIG_7

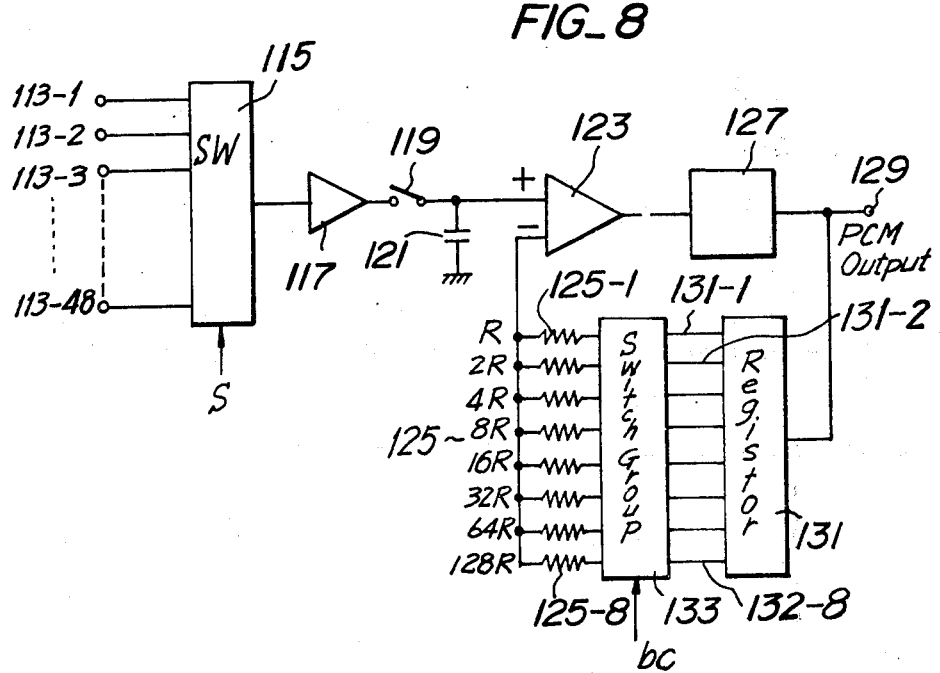
FIG_8

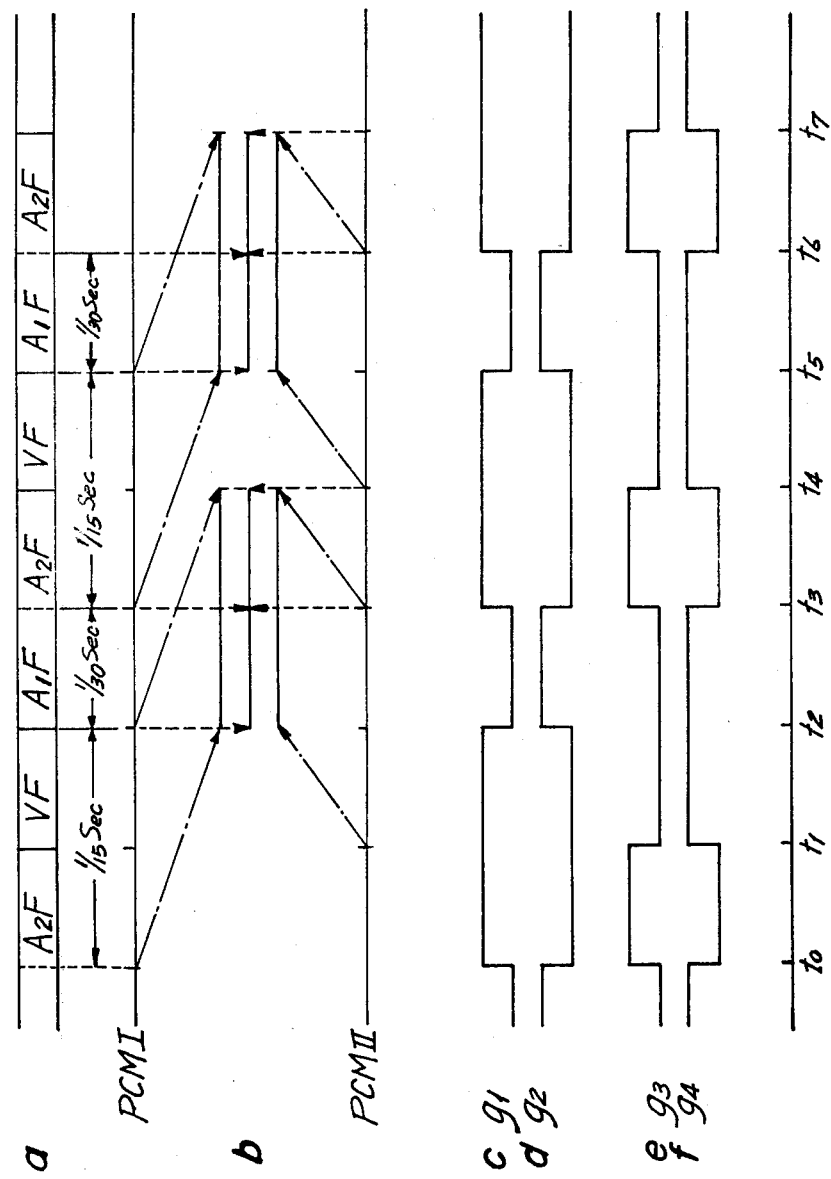

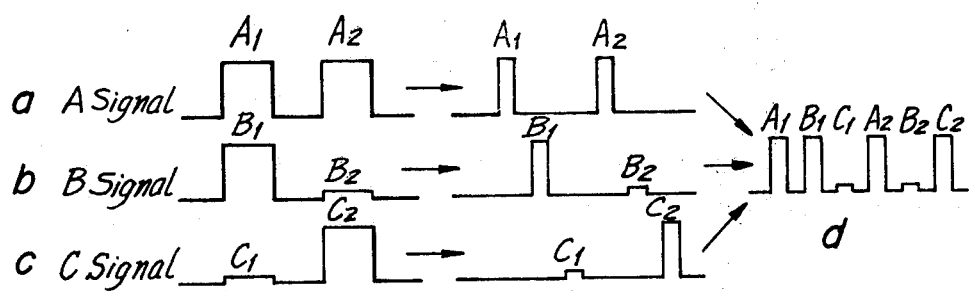
FIG_10

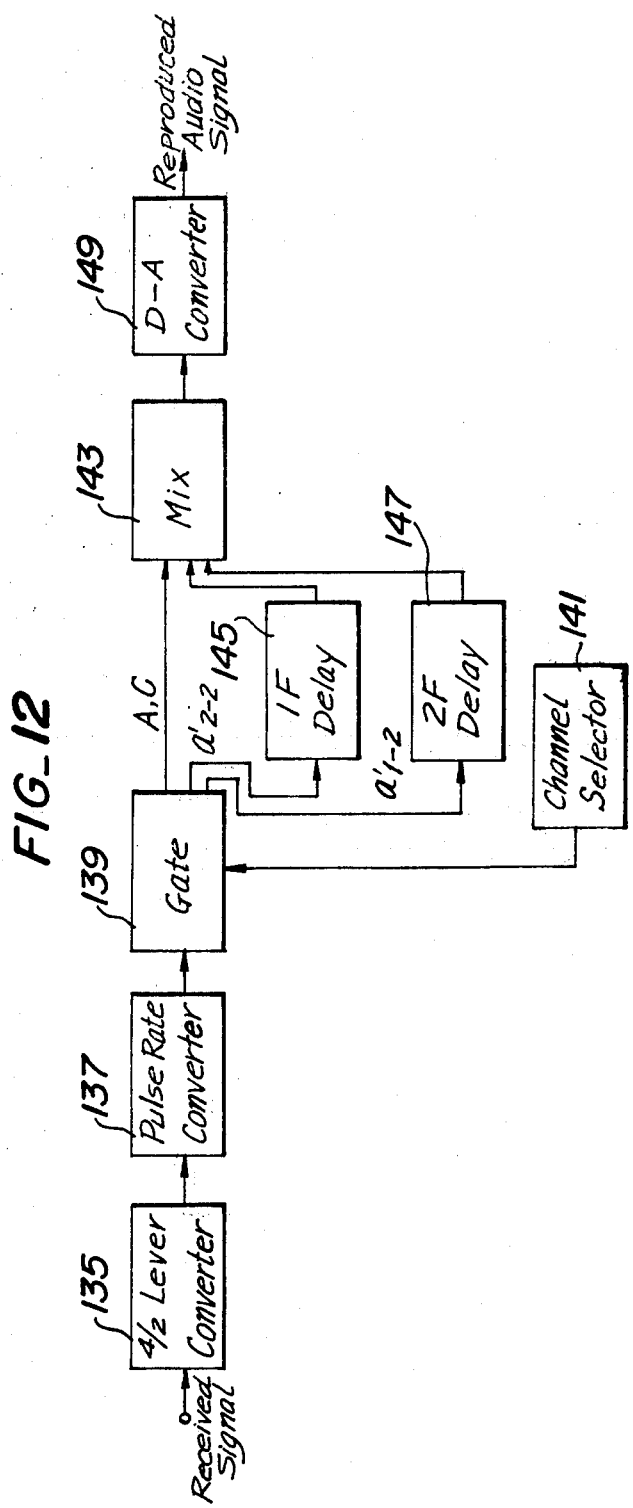

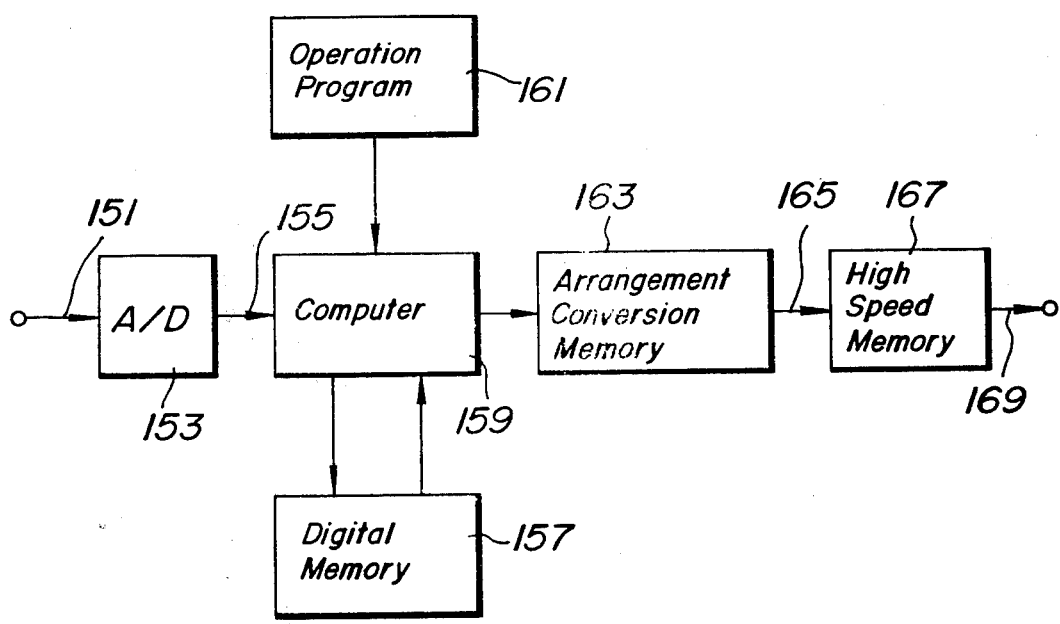
FIG_13

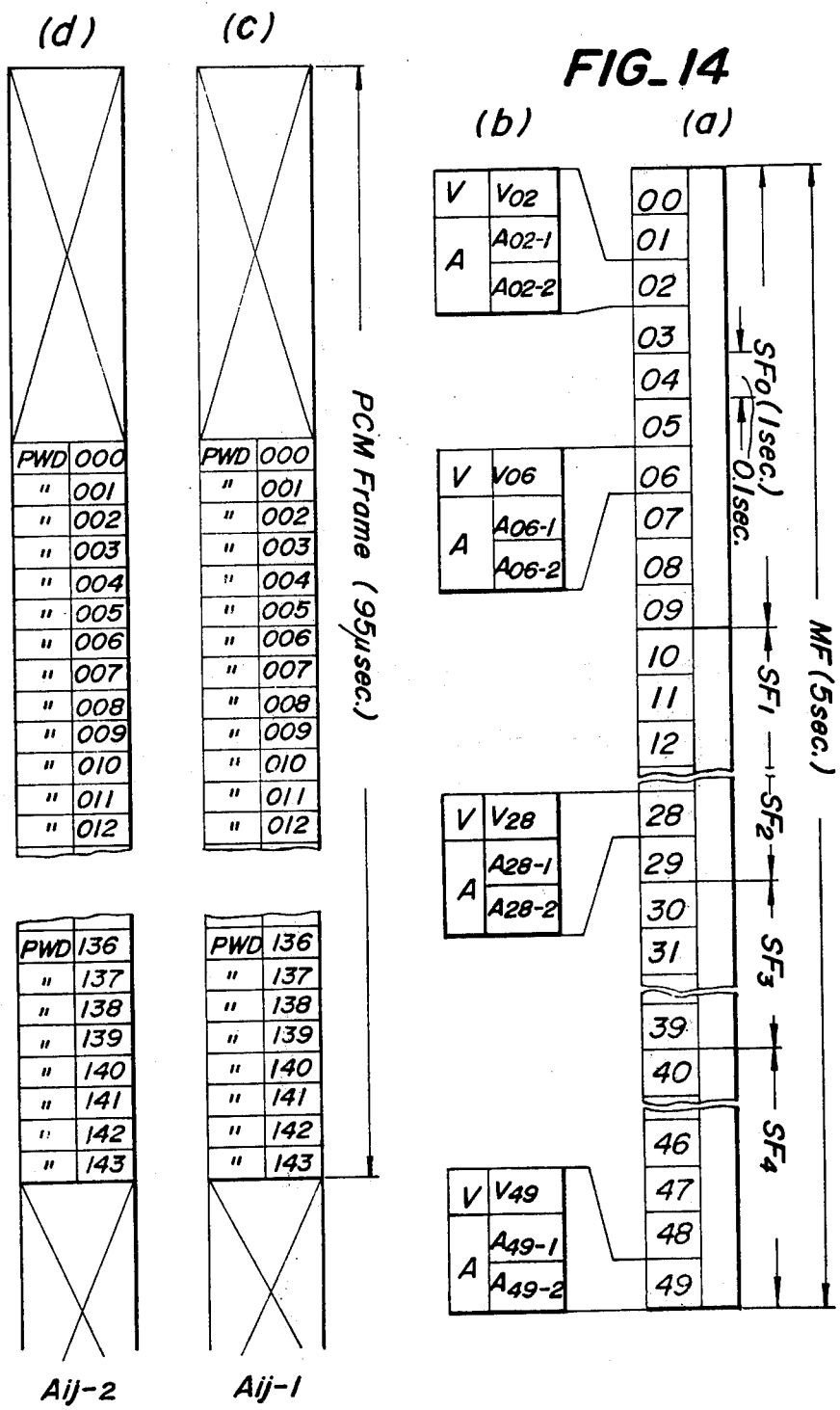

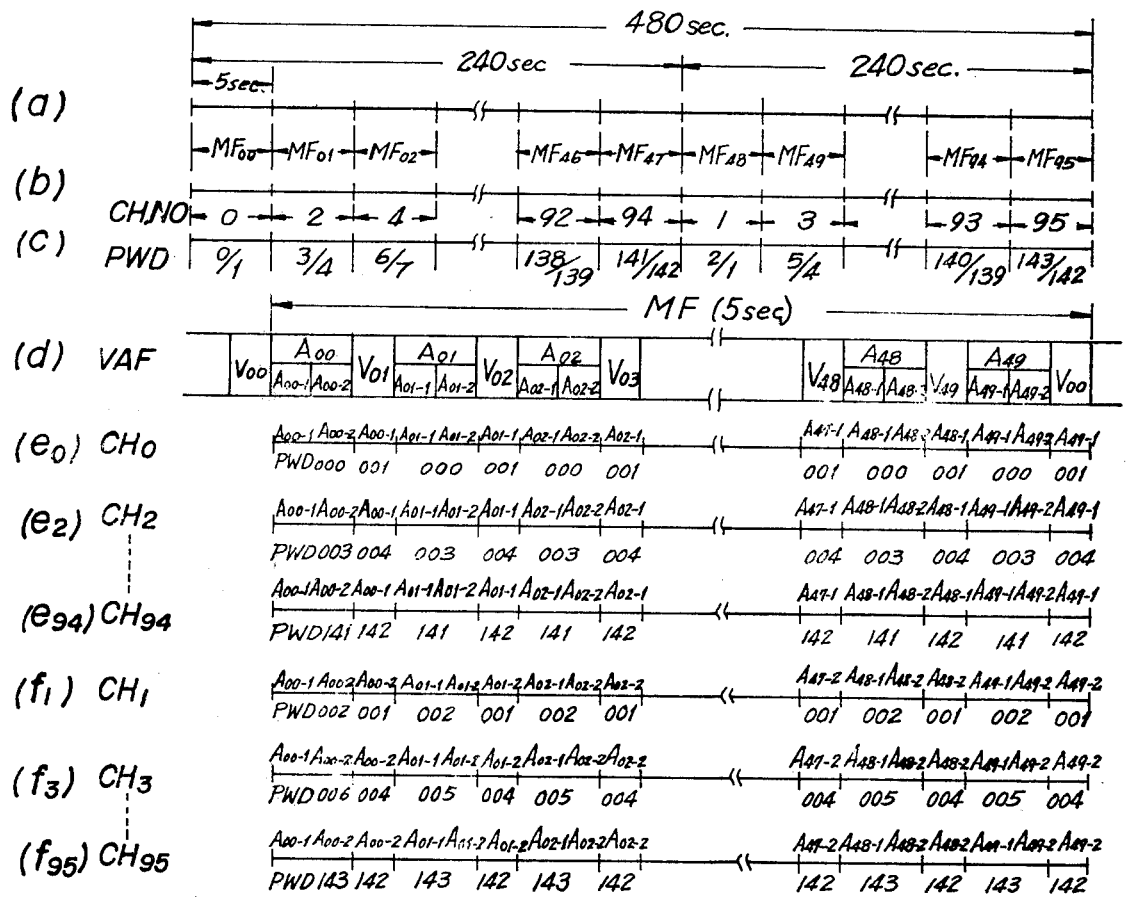
FIG_15

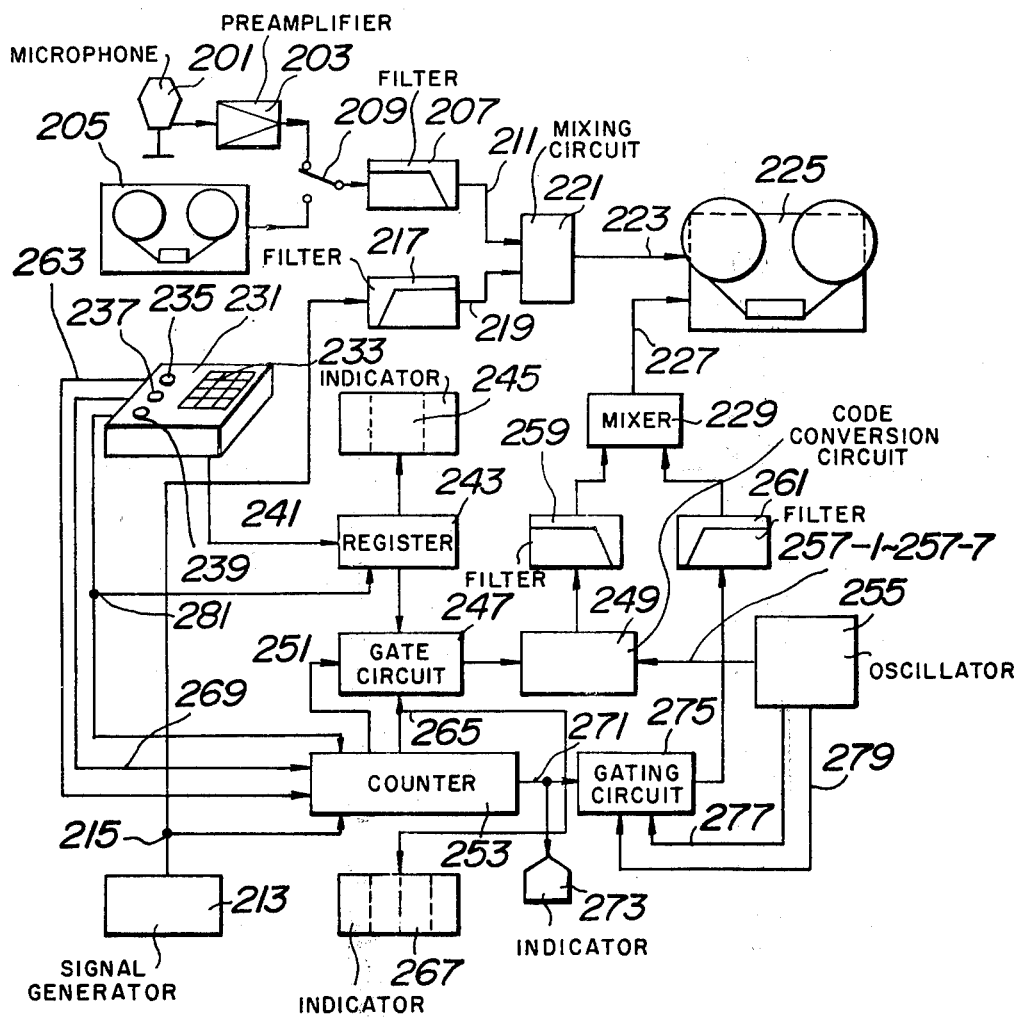
FIG_16

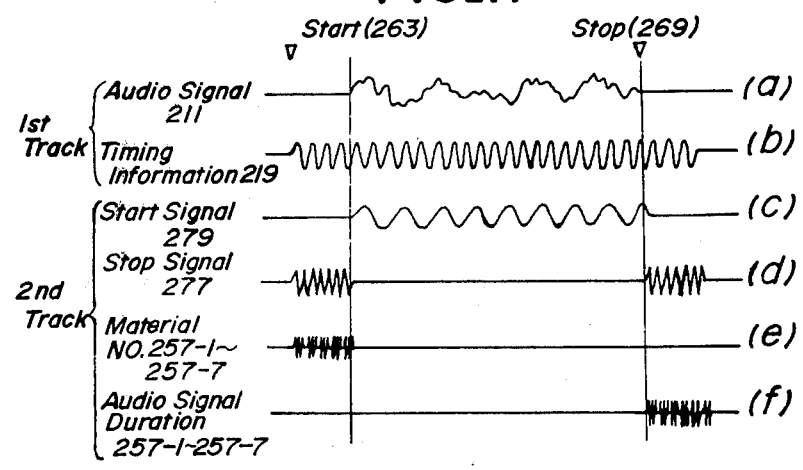

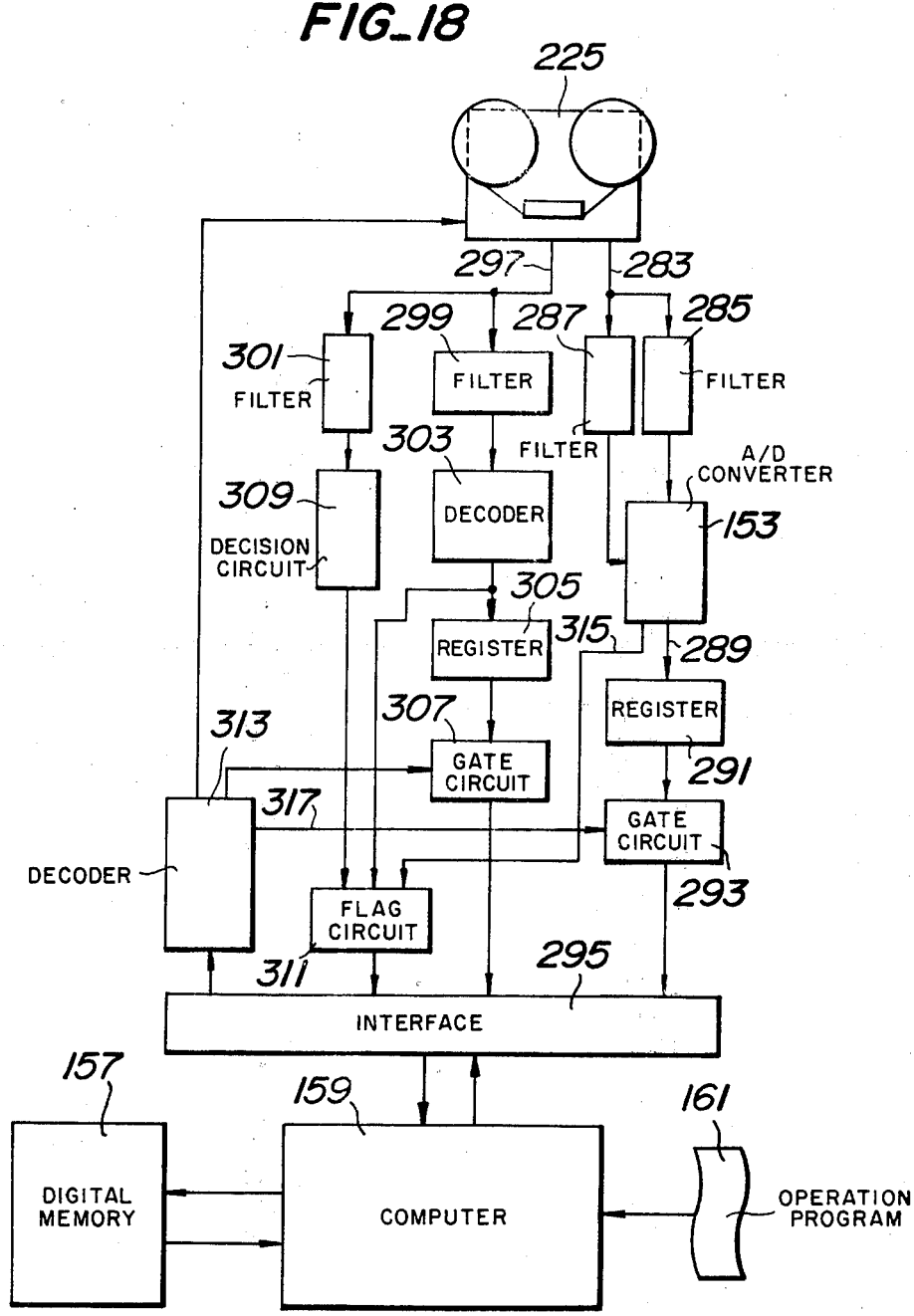

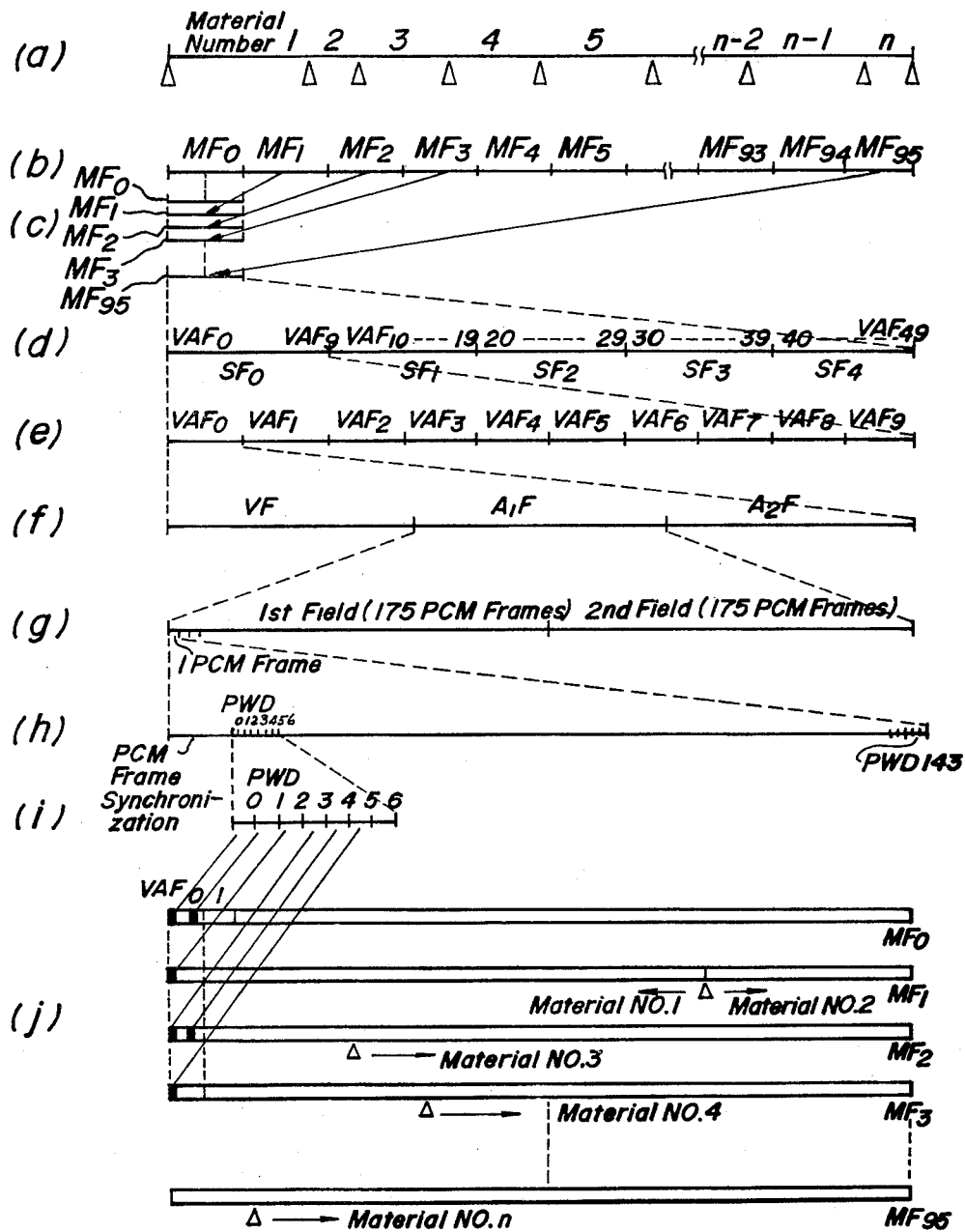
FIG_19

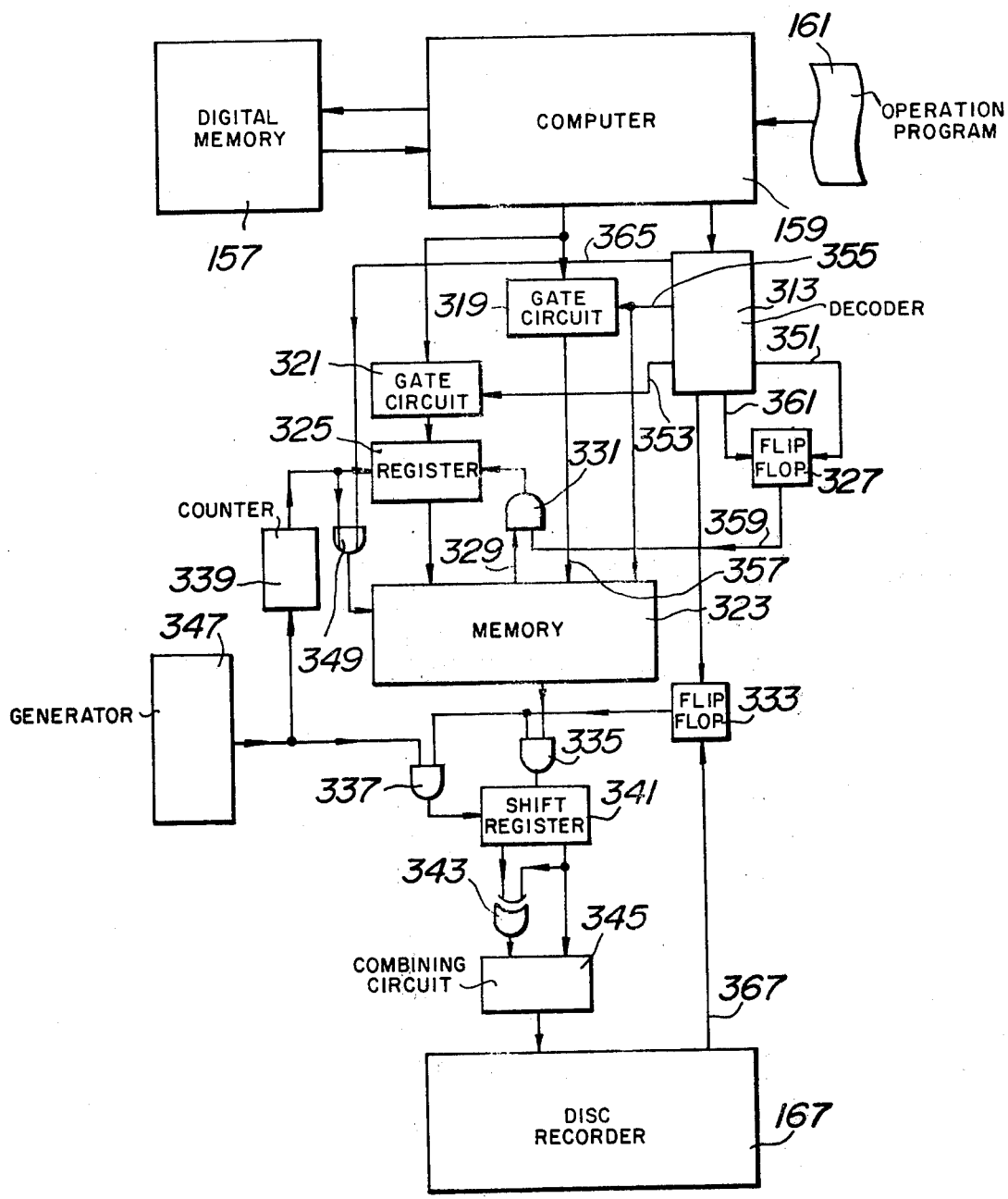
FIG_20

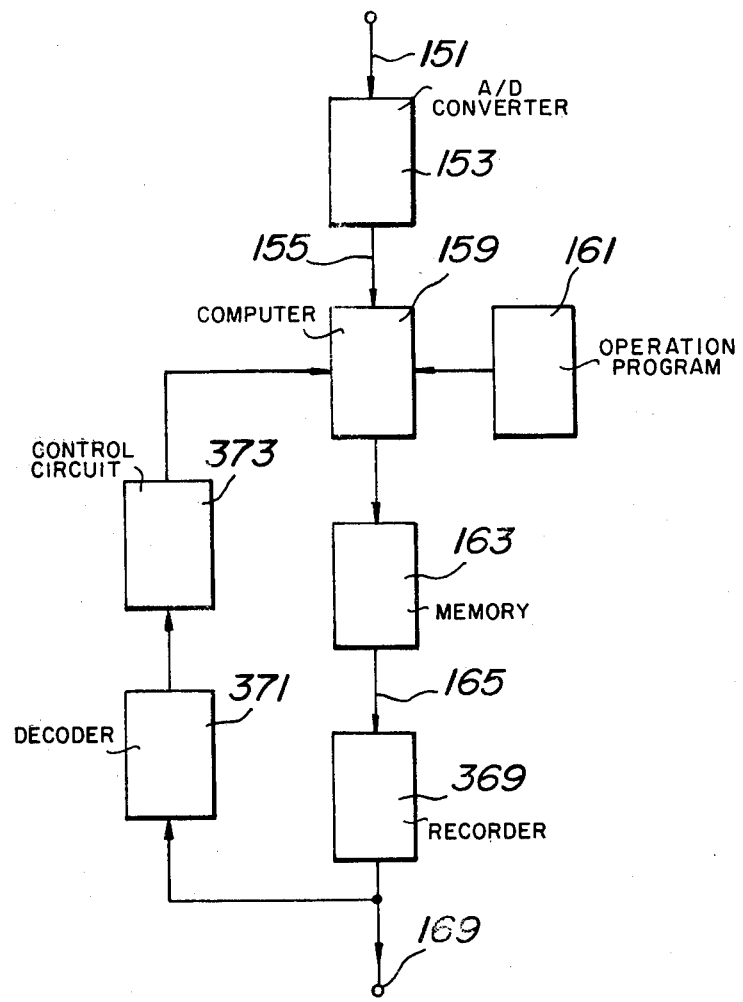

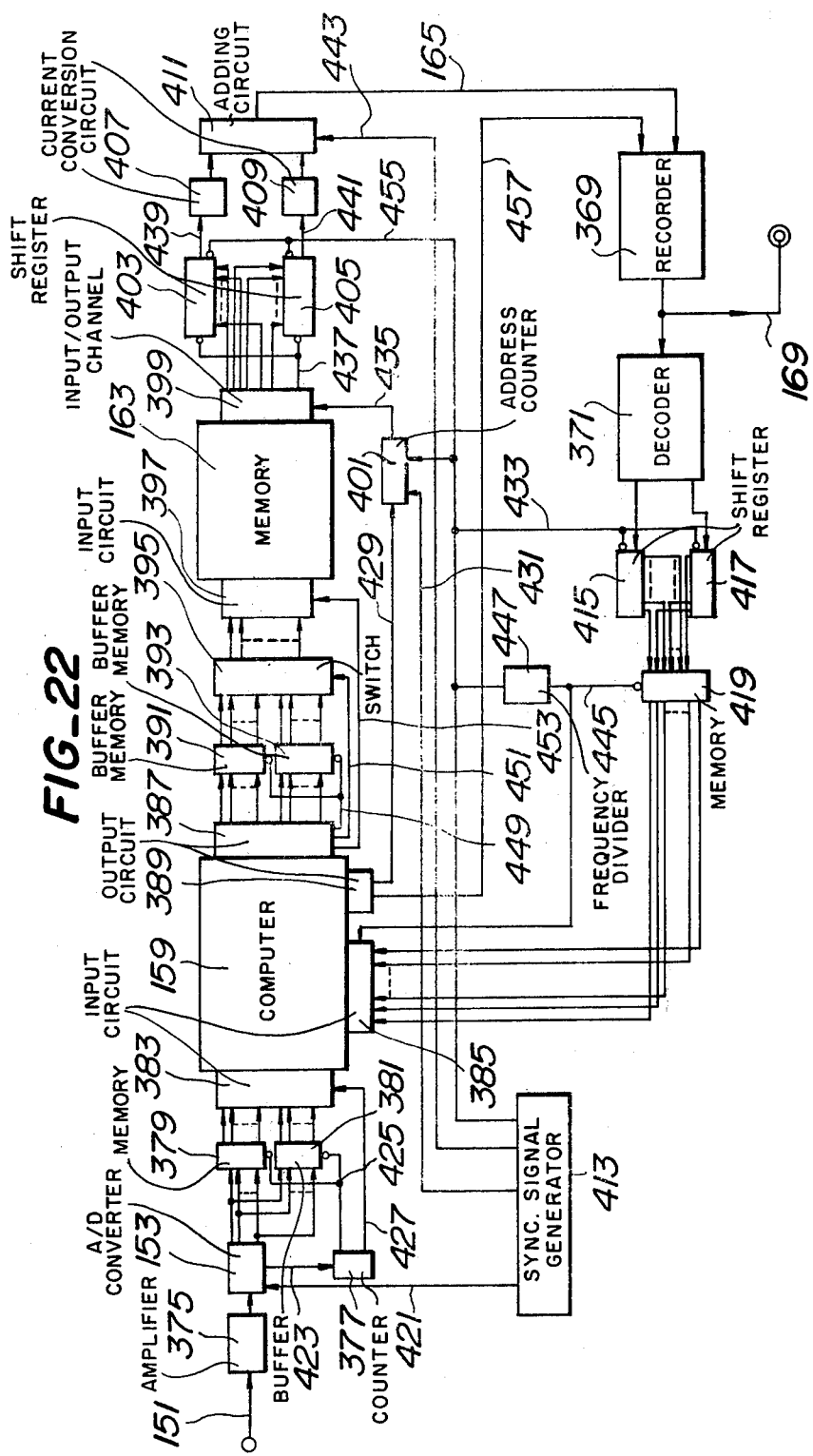

SIGNAL EDITING AND PROCESSING APPARATUS

BACKGROUND OF THE INVENTION

The present invention relates to a signal editing and processing apparatus for converting a plurality of continuous signals to a transmitting signal in which a pause period and a signal transmission period having an integer period ratio with said pause period are sequentially repeated. This invention is widely related to a signal transmission system wherein the continuous signals are transmitted through an intermittent transmission line which is interrupted time-sequentially.

Especially, this invention provides an editing and processing apparatus for an audio signal in a still picture transmission system for alternately transmitting video and PCM audio signals which are intermittently divided by different periods of division, without losing continuity of the audio signal.

As to a signal which is divided by a given constant period, a television audio signal or a facsimile signal which is divided by the period of scanning, and a TDM signal obtained by time-divisionally multiplexing audio and other information signals in the form of pulse code modulation (PCM) signal are known.

A type of broadcasting which is able to conform with the needs of the variety and individuality of human life can be considered one of the ideals of future broadcasting. Super multiplexing still picture broadcasting elicits great interest of broadcasters and educators as an economical and technological means through which a great deal of information can be conveyed.

The concept of still picture transmission by television signals has been reported by W. H. Huges et al., at Oklahoma State University. This system has been planned for a cable transmission system which is capable of two-way transmission. But, they did not report the details of sound transmission. In most cases, it is advantageous to transmit the sound together with the picture because, in general, watching television without sound does not use the human senses well, and it is less effective for viewers. Therefore, it has been desired to develop a novel transmission system of still pictures and corresponding sounds in order to study the most effective use of still picture broadcasting and the acceptability of still pictures by viewers.

The present invention is to provide a signal editing and processing apparatus in a transmission system which can transmit still pictures together with sounds related thereto. It should be noted that the present invention is not limited to a transmission system for still pictures and their related sounds, but may be used to transmit television video signals or facsimile signals which are divided into scanning periods and any other time division multiplexed information signals in the form of PCM, PTM (pulse time modulation), PWM (pulse width modulation) or PAM (pulse amplitude modulation) signals. However, for the sake of explanation, in the following description the transmission system for transmitting still pictures and related sounds as television signals through a television transmitting path will be explained. That is to say, video signals of still pictures and audio PCM signals are transmitted on the same transmission path at a rate of one to two television frames of the NTSC system. Thus, video signals of each still picture are transmitted in one frame period (about 1/30 seconds) as quasi-NTSC signals and audio PCM signals are transmitted in successive two frame periods (about 1/15 seconds). A plurality of still pictures and their related sounds constitute a single group termed as a program. At a transmitter end, this program is transmitted repeatedly and at a receiver end one can select a desired still picture and its related sound from the source program to be transmitted. At the transmitter end there may be provided a plurality of programs and a first program is transmitted repeatedly in a given period and so on. And at the receiver end one can select a desired program from a plurality of transmitted programs. A time duration of a program is established considering various factors such as amounts of information to be transmitted, i.e., the number of still pictures, necessary time duration of sounds, etc., property of a transmission path and its bandwidth, complexity of apparatuses at transmitter and receiver ends, and permissible access time (permissible waiting time) on the basis of psychological characteristic of viewers. In the embodiment described hereinafter a time duration of a program is determined to be 5 seconds.

Now, a basic construction of the still picture transmitting system described hereinabove will be firstly explained with reference to FIGS. 1 to 4. FIG. 1 shows a format of the video-audio muliplexed signal to be transmitted. FIG. 1a denotes a program of five seconds. The program is termed as a master frame MF. The master frame MF consists of five sub-frames SF, each of which has a duration of one second. As shown in FIG. 1b, each sub-frame SF consists of 10 video-audio frames VAF and each video-audio frame VAF has a duration of 1/10 seconds. As illustrated in FIG. 1c, each video-audio frame VAF further consists of a video frame VF of one television frame period (about 1/30 seconds) and an audio frame AF of two television frame periods (about 1/15 seconds). Each audio frame AF further consists of a first audio frame $A_1F$ and a second audio frame $A_2F$, each having one television frame period (about 1/30 seconds). Thus, the master frame MF is composed of a 150 television frames.

By constructing the master frame MF as mentioned above, in the master frame MF, there may be inserted 50 still pictures. However, in fact, it is necessary to transmit code signals for identifying still pictures and their related sound and for indicating timings of starts and ends of various signals. It is advantageous to transmit such code signals in the video frames VF rather than in the audio frames AF. In the present embodiment, code signals are transmitted in a video frame VF of each sub-frame SF. A frame during which the code signals are transmitted is referred to as a code frame CF. FIG. 1d shows a part of the sub-frame SF which includes said code frame CF. Therefore, in the master frame MF, there are inserted 45 still pictures and thus, it is required to transmit 45 sounds related thereto, i.e., 45 channels of audio signals.

Sound like speech or music needs several seconds or more to give some meaning, because sound is inherently continuous. In the present embodiment an average duration of each sound relating to each still picture is limited to ten seconds. As mentioned above, the master frame MF has a duration of only 5 seconds, so that in order to transmit sounds of 10 seconds, it is necessary to use the number of channels twice the number of sound channels. That is, in order to transmit sounds of 45 channels relating to 45 still pictures, it is required to establish 90 audio channels. Moreover, it is impossible to transmit audio signals in the video frames VF. Therefore, PCM audio signals must be divided and allocated in the audio frames AF only. In order to effect such an allocation treatment for audio signals, the PCM audio signals of 90 channels are divided into two groups PCMI and PCMII as shown in FIG. 1e. Portions of PCMI corresponding to the second audio frames $A_2F$ and the video frames VF are delayed for two television frame periods of about 1/15 seconds and portions of PCMII corresponding to the video frames VF and the first audio frames $A_1F$ are delayed for one television frame period of about 1/30 seconds. PCM signals thus delayed form audio channels A and C are illustrated in FIG. 1e. Portions of PCMI and PCMII which correspond to the first audio frames $A_1F$ and the second audio frames $A_2F$, respectively, are directly inserted in audio channels $B_1$ and $B_2$ to form an audio channel B. In this manner, in the audio channels A, B and C, there are formed vacant frames and these vacant frames correspond to the video frames VF. By effecting such an allocation for the audio signals, in each audio frame AF it is necessary to establish a number of audio channels which is one and a half times of the number of the audio signal channels. In the present embodiment, 135 audio channels have to be provided in each audio frame AF. In this manner, audio signals of 135 channels are inserted in each audio frame AF in the form of PCM signals allocated in given time slots.

An embodiment of a transmitting apparatus for effecting the above mentioned still picture-PCM audio signal time division multiplexing transmission will now be explained with reference to FIG. 2. The transmitting apparatus comprises a video signal processing system and an audio signal processing system. The video signal processing system comprises a random access slide projector 1, on which are loaded slides of still pictures to be transmitted. The projector 1 projects optically an image of a slide of a still picture onto a television camera 3. The camera 3 picks up the image and produces an electrical video signal. The video signal is supplied to a frequency-modulator 5 and frequency-modulates a carrier by the video signal. The FM video signal is amplified by a recording amplifier 7 and an amplified video signal is supplied to a video recording head 9. This head 9 is an air-bearing type floating head and is arranged to face a surface of a magnetic disc memory 11. The head 9 is driven by a head driving mechanism 13 so as to move linearly in a radial direction above the surface of the disc memory 11. The disc memory 11 is preferably made of a plastic disc having a coated magnetic layer thereon. This kind of memory has been described in detail in an NHK Laboratories Note Serial No. 148, "Plated magnetic disc using plastic base"; December 1971. The disc 11 is rotatably driven by a motor 15 at a rate of thirty rounds per second. There is further provided an air-bearing type floating head 17 for reproducing video signals recorded on the disc memory 11. The reproducing head 17 is also driven by a driving mechanism 19 so as to move linearly in a radial direction above the surface of the disc 11. The magnetic heads 9 and 17 are moved intermittently so that on the surface of the disc 11 there are formed many concentric circular tracks. On each track is recorded the video signal for one television frame period corresponding to each still picture. The reproduced video signal from the reproducing head 17 is supplied to a reproducing amplifier 21 and the amplified video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of AMTEC. The time-error compensated video signal is supplied to a video input terminal of a video-audio multiplexer 27.

The audio signal processing system comprises an audio tape recorder 29 of the remote controlled type. On this tape recorder 29 is loaded a tape on which many kinds of audio signals related to the 45 still pictures have been recorded. The reproduced audio signals from the tape recorder 20 are suplied to a switcher 31 which distributes each audio signal corresponding to each still picture to each pair of recording amplifiers 33-1, 33-2; 33-3, 33-4, . . . 33-n. The amplified audio signals from the amplifiers 33-1, 33-2, 33-3 . . 33-n are supplied to audio recording heads 35-1, 35-2, 35-3 . . . 35-n, respectively. There is provided an audio recording magnetic drum 37 which is rotated by a driving motor 39 at a rate of one revolution for 5 seconds. As already described above, each sound corresponding to each still picture lasts for 10 seconds, so that each audio signal of each sound is recorded on two tracks of the magnetic drum 37 by means of each pair of audio recording heads 35-1, 35-2; 35-3, 35-4, . . . 35-n. That is, a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 41-3 . . . 41-n, the number of which corresponds to the number of the audio recording heads 35-1, 35-2, . . . 35-n. In the present embodiment n=90. The reproduced auido signals are amplified by reproducing amplifiers 43-1, 43-2, 43-3 . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. This PCM audio signal is further supplied to an audio allocation processor 49 in which the PCM audio signal is allocated in the audio frames AF as explained above with reference to FIG. 1e. The detailed construction and operation of the audio allocation processor 47 will be explained later. The PCM audio signal supplied from the processor 49 is a two-level PCM signal. This two-level PCM signal is converted in a two-four level converter 51 into a four-level PCM signal. The four-level PCM audio signal is supplied to an audio signal input terminal of the video-audio multiplexer 27. In the multiplexer 27, the video signal from the time-error compensator 25 and the four-level PCM audio signal from the two-four level converter 51 are multiplexed in a time division mode. A multiplexed video-audio signal from the multiplexer 27 is supplied to a code signal adder 53 which adds to said signal the code signal for selecting desired still pictures and their related sounds at a receiver end to form the signal train shown in FIG. 1d. The signal train from the code signal adder 53 is further supplied to a synchronizing signal adder 55 in which a digital synchronizing signal is added to form an output video-audio signal to be transmitted.

In the transmitting apparatus shown in FIG. 2, there are further provided servo amplifiers 57 and 59 so as to maintain the rotation of the video disc memory 11 and the audio magnetic drum 37 to be constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47, the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of a code signal; etc., the control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mchanism 13, the video reproducing head driving mechanism 19 and the switcher 31, respectively.

In the transmitting apparatus mentioned above, the random access slide projector 1 is controlled by the control device 63 to project successive by 45 still pictures and the video recording head 9 is driven by the mchanism 13 so as to face tracks of the disc memory 11. In this case, the video recording head 7 moves in one direction to face alternate by 23 tracks so as to record 23 still pictures and then moves in an opposite direction to face the remaining 22 tracks which are situated between the tracks on which the video signals of the first 23 still pictures have been recorded. The video recording amplifier 7 receives a gate signal D of 1/30 seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal S supplied from the generator 61. The video reproducing head 17 is driven by the mechanism 19 in the same manner as the video recording head 9. The reproducing head 17 is moved in the audio frame and code frame period and is stopped in the video frame period to reproduce the video signal. The reproducing head 17 repeatedly reproduces the audio signal of 45 still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previously recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator and then to the recording amplifier 7. Before recording, d.c. current is passed through the video recording head 9 and the previously recorded video signal is erased. Then the new video signal is recorded on the erased track of the disc 11. For sound information, a new sound is reproduced by the audio tape recorder 29 and a given track of the magnetic drum 37 is selected by the switcher 31. before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Next, a basic construction of a receiver will be explained with reference to FIG. 3. A received signal is supplied in parallel to a synchronizing signal regenerator 67, a video selector 69 and an audio selector 71. In the synchronizing signal regenerator 67, a synchronizing signal is regenerated from the received signal. The synchronizing signal thus regenerated is supplied to a timing signal generator 73. The timing signal generator 73 is also connected to an instruction keyboard 75. The timing signal generator 73 produces timing signals to the video selector 69 and the audio selector 71 on the basis of the synchronizng signal from the regenerator 67 and the instruction from the keyboard 75. The video selector 69 selects a desired video signal and the audio selector 71 selects a desired audio signal related to the desired video signal. The selected video signal of the desired still picture is once stored in a one-frame memory 77, and the video signal of one frame period is repeatedly read out to form a continuous television video signal. This television video signal is displayed on a television receiver 79.

The selected audio PCM signal is supplied to an audio reallocation processor 81 to recover a continuous audio PCM signal. The audio PCM signal is supplied to a D-A converter 83 to form an analog audio signal. This audio signal is reproduced by a loud speaker 85.

Now, the operation of the receiver will be explained in detail with reference to FIG. 4 showing various waveforms.

In the synchronizing signal regenerator 67, PCM bit synchronizing signals and PCM frame synchronizing signals are reproduced in the manner which will be described later in detail and also gate signals shown in FIGS. 4b, 4c and 4d are produced. The timing signal generator 73 detects a picture identification code VID which has been transmitted in a vertical flyback blanking period at a foremost portion of the picture transmission frame period VF. As shown in FIG. 4a, the picture identification code $\alpha$ for the picture P$\alpha$, the picture identification code $\beta$ for the picture P$\beta$ and so on are transmitted at the foremost portion of the picture transmission frame periods VF. The timing signal generator 73 compares the detected picture identification code VID with a desired picture number, for example $\beta$ instructed by the keyboard 75. If they are identified to each other, the timing signal generator 73 produces a coincidence pulse shown in FIG. 4e. The coincidence pulse is prolonged by a monostable multivibrator circuit as shown by a dotted line in FIG. 4e and the prolonged pulse is gated out by the gate signal shown in FIG. 4b to form a video gate signal illustrated in FIG. 4f. The video gate signal is supplied to the video selector 69 to gate out the video signal $P\beta$ in a desired video frame and the video signal $P\beta$ thus selected is stored in the one-frame memory 77. In the memory 77, the video signal $P\beta$ is repeatedly read out so that the continuous video signal shown in FIG. 4g is supplied to the television receiver 79. Thus, the television receiver 79 displays the video signal $P\beta$ as a still picture instead of the picture $P\eta$ which has been displayed.

The audio signal is transmitted in the audio frame periods $A_1F$ and $A_2F$ in the form of a PCM multiplexed signal. The timing signal for selecting a PCM channel number corresponding to the desired picture number, for example $\beta$ is generated by counting the above mentioned PCM bit synchronizing pulses and PCM frame synchronizing pulses. The timing signal thus generated is supplied to the audio selector 71 to select the desired PCM signal related to the selected still picture. FIG. 4h illustrates a pulse series of the audio channel A selected by the audio selector 71 and FIG. 4i shows a pulse series of the audio channel $B_1$ selected by the audio selector 71 and gated out by the gate signal shown in FIG. 4c. The audio reallocation processor 81 supplies the PCM pulse series shown in FIG. 4h directly to the D-A converter 83 and also supplies the PCM pulse series of FIG. 4i to the D-A converter 83, but after a delay of two television frame periods as shown in FIG. 4j. To this end, the timing signal from the generator 73 is supplied to the processor 81. The pulse series shown in FIGS. 4h and 4j are combined to form a continuous pulse series shown in FIG. 4k. The combined PCM signal is converted by the D-A converter 83 into the continuous analog audio signal.

When the desired sound is transmitted in the channels C and $B_2$, the same operation as above will be carried out as shown in FIGS. 4l, 4m, 4n and 4o to form a desired continuous analogue audio signal. The picture number and the PCM channel number may be correlated to each other in such a manner that even number pictures correspond to the audio channels A and $B_1$ and odd number pictures correspond to the audio channels C and $B_2$.

As is apparent from the above, in case when the continuous signals are effectively transmitted through the intermittent transmission line such as transmitting the video signal of the still picture and the audio signal after multiplexing these signals, these plurality of signals are transmitted through a plurality of channels of the transmission line having the sequentially repeated periods composed of a pause period and a signal transmitting period having an integer ration therebetween. In this case, the respective ones of said plurality of channels of the continuous signals are divided into the first signal having a duration equal to that of said signal transmission period and the second signal having a duration equal to that of said pause period, one of said first and second signals being delayed, and only the second signals in said plurality of channels of the continuous signals being sequentially combined so as to form the third signal having a duration equal to that of said signal transmission period. After such a signal processing, the channel for transmitting said first signal and the further channel for transmitting the third signal are provided so as to transmit these first and third signals during the signal transmission period.

Next, the explanation will be made about the process for converting the plurality of channels of the continuous signals to the above-mentioned transmitting signals.

Referring to FIG. 5, an embodiment of the signal transmission system in which the ratio of the signal transmission period and the pause period is 2:1, such as a still picture transmission system in which the audio frame (AF) period is equal to two TV frames (2F) and the video frame (VF) period to one TV frame (1F) will be explained in detail hereinafter.

As shown in FIG. 5a, two channels of audio signals $a_1$ and $a_2$ are respectively divided into parts $a_{1-1}$ and $a_{2-1}$ corresponding to the VF period and parts $a_{1-2}$ and $a_{2-2}$ corresponding to the AF period. The parts $a_{1-1}$ and $a_{2-1}$ are delayed by 1F and 2F respectively. Both of the thus delayed parts $a'_{1-1}$ and $a'_{2-1}$ are time-sequentially combined to form a new signal B which is contained in No. 2 channel. The remaining parts $a_{1-2}$ and $a_{2-2}$ are contained respectively to No. 1 and No. 3 channels as signals A and C. In this manner, two kinds of sound signals having a time length of 3F are converted to three resultant signals contained in the channels of 2F.

In order to reproduce the original signals $a_1$ and $a_2$ from the resultant signals A, B and C of FIG. 5a at the receiving side, the process shown in FIG. 5b is employed. In this case, the amount or time length of the signal to be temporarily stored is 2F as is clear from FIG. 5b. Because, in the transmitting side, the 1F parts $a_{1-1}$ and $a_{2-1}$ are time-sequentially combined after being delayed or stored, it is necessary to store the received signals in order not to reverse the sequence of the received signals at the receiving side. In the usual broadcasting system, however, it is preferable to reverse the sequence of the signals to be temporarily stored in the transmitting side, since, in order to pervade the still picture broadcasting, it is desired to make simple the configuration of the receiving unit compared with the transmitting unit. That is, the time lengths of the parts $a_{1-1}$ and $a_{2-1}$ are 2F, respectively, and the time lengths of the parts $a_{1-2}$ and $a_{2-2}$ are 1F, respectively. As shown in FIG. 5c, the beginning instant of the audio signal $a_2$ is delayed by a 1F period, and the part $a_{1-1}$ is delayed by a 2F period so as to form a signal $a'_{1-1}$ which is contained in the channel No. 1. The part $a_{2-1}$ is delayed by a 1F period so as to form a signal $a'_{2-1}$ which is contained in the channel No. 3. Both of the remaining parts $a_{1-2}$ and $a_{2-2}$ are combined so as to be contained in the channel No. 2. When reproducing, as shown in FIG. 5d, the parts $a_{1-1}$ and $a_{2-1}$ are not delayed, the part $a'_{1-2}$ is delayed by the 2F period, and the part $a'_{2-2}$ is delayed by the 1F period. The resultant signals after such delaying are combined with the parts $a_{1-1}$ and $a_{2-1}$ so as to reproduce the original signals $a_1$ and $a_2$. According to this processing, it is sufficient that the signal of the 1F period be stored by delay or storage means of the receiving unit, so that the arrangement of the receiving terminal becomes simple.

As clearly shown in FIGS. 5c and 5d, according to the above method, two signals $a_1$ and $a_2$ are divided into sections or parts such as $a_{1-1}$, $a_{1-2}$, $a_{2-1}$, $a_{2-2}$, the sequence of which is rearranged. In this case, the sequence of signals contained in each part is not changed, so that it is sufficient only to delay the signal by taking the time period of the part (1F) as the unit of delay time.

In this way, 96 kinds of audio signals are converted into 144 kinds of sectional signals each of which is contained in a time slot having a time duration of 2F. Between two adjacent time slots formed is a blank period of 1F. In order to multiplex these 144 kinds of signals, the original audio signal is modulated in the form of PCM and the signal obtained by this PCM signal is multiplexed in time division. Here, if the above signal delaying and combining is processed within a frequency band in which the original audio signal is present, then 96 independent audio processors are required for processing the above delay and combination of the signals.

In order to reduce the number of such independent audio processors, two PCM-TDM apparatuses are employed for processing 48 audio signals in a PCM-TDM manner. The two outputs resulting from these two apparatuses by PCM-TDM processing can be used as two channels of signals $a_1$ and $a_2$ of FIG. 5. These outputs can be dealt with only two PCM-TDM type audio processors in a same way as the above, so that the configuration of the audio processor in which the three signals A, B and C are multiplexed can be fabricated without complexity.

FIG. 6 shows an arrangement of an audio processor in the transmitting unit in the case of multiplexing audio signals in a PCM-TDM manner. This audio processor corresponds to said audio multiplexer 45, the A-D converter 47, the audio allocation processor 49 and the two-four level converter 51 in FIG. 2. In FIG. 6, the reference numeral 87 denotes a PCM timing signal generator for producing PCM frame synchronizing signal F, audio sampling signal S, bit clock $bc$, synchronizing signal V per TV frame and so on. The reference numeral 89 denotes a gate signal generator for producing gate pulses $g_1$, $g_2$, $g_3$ and $g_4$ from said synchronizing signal V from said generator 87. These gate pulses have such periods as shown in FIG. 4a. The reference numerals 91 and 93 denote PCM-TDM processors in which the audio signal is converted into the PCM signal and in which the PCM signal is multiplexed in time division. For example, 96 channels of audio signal are separated into two sets of channels, i.e., 1st to 48th channels and 49th to 96th channels. These two channel sets are processed to form PCM-TDM signals $a_1$ and $a_2$. The reference numerals 95, 97, 99 and 101 denote AND gate circuits. The gate 95 receives the $a_1$ signal and gate signal $g_1$ to gate said $a_1$ signal as shown in FIG. 5c. That is, this gate is on during every two frame periods such as $t_0$-$t_2$, $t_3$-$t_5$ . . . and this gate is off during the remaining one frame period such as $t_2$-$t_3$, $t_5$-$t_6$ . . . The gate 97 receives the gate signal $g_2$ the polarity of which signal is reversed to that of signal $g_1$. This gate is off during two frame periods and is on during one frame period (such as $t_2$-$t_3$). The gate 99 receives the gate signal $g_3$. This gate signal $g_3$ is delayed by one frame period relative to the gate signal $g_1$, so that this gate 99 is on during two frame periods (such as $t_1$-$t_3$) and is off during one frame period after one frame period compared with the gate 95. The gate 101 receives the gate signal $g_4$ which is delayed by one frame period relative to the gate signal $g_2$. This gate is off during two periods and is on during one period (such as $t_3$-$t_4$). These on and off timings are reversed to that of said gate 99. A delay circuit 103 is connected to said gate 95 to delay the output thereof by two frame periods. A delay circuit 105 is connected to said gate 101 to delay the output thereof by one frame period. The outputs of said gates 97 and 99 are connected to a mixing circuit 107. The reference numeral 109 denotes a time division multiplexer which receives the signal $a'_{1\text{-}1}$ from the delay circuit 103, the signal $a'_{2\text{-}1}$ from the delay circuit 105 and the signals $a'_{1\text{-}2}$, $a'_{2\text{-}2}$ from said mixing circuit 107 so as to multiplex these signals in time division. The output of this multiplexer 109 is supplied to a two-four level converter 111 in which a two level PCM signal is converted to a four-level PCM signal as described hereinafter.

The multiplexer 109 is composed of a shift register such as "9300" of the Fairchild Company which has a plurality of parallel input terminals and one serial output terminal. Supplied to these parallel input terminals are said signals $a'_{1\text{-}1}$, $a'_{1\text{-}2}$, $a'_{2\text{-}1}$ and $a'_{2\text{-}2}$. By using a clock pulse train having a bit rate higher than said bit clock $bc$ by three times, these signals $a'_{1\text{-}1}$, $a'_{1\text{-}2}$, $a'_{2\text{-}1}$ and $a'_{2\text{-}2}$ are read out sequentially from said serial output terminal.

For example, in case of 96 channels of audio signals, the audio signals of the 1st to 48th channels are pulse-code-modulated and multiplexed in time division by said first PCM-TDM processor 91. In this example, PCM processing is carried out by a sampling frequency of 10.5 KHz, 256 quantizing levels (8 digit numbers) and frame period pulse of 8 digits, and a pulse repetition frequency obtained by multiplexing 50 channels of audio signals in time division is 4.116 MHz.

The remaining audio signals 49th to 96th channels are also processed by said second PCM-TDM processor 93 in a similar way. The two series of PCM pulse trains thus produced are arranged as shown in FIG. 7. As the sampling frequency of this example is chosen to be 10.5 KHz which is equal to 2/3 the time of the horizontal synchronizing frequency 15.75 KHz of the television signal, one television picture, i.e., one television frame (1F=525 scanning lines), is equal to 350$f$ ($f$ is a PCM frame). Accordingly, the audio signal corresponding to three television frames (3F) is equal to 1050$f$ of PCM frames. The former PCM frames 700$f$ are allotted to the signal $a_{1\text{-}1}$ or $a_{2\text{-}1}$ and the remaining latter frames 350$f$ are allotted to the signal $a_{1\text{-}2}$ or $a_{2\text{-}2}$.

As to pulse arrangement within 1$f$ of the PCM-TDM signal, as shown in FIG. 7b, the 1st to 8th pulses are allotted to PCM frame synchronization, 9th to 16th pulses to the quantized pulse group corresponding to the first audio signal, 17th to 24th pulses to that corresponding to the second audio signal, and 384th to 392nd pulses to that corresponding to the 48th audio signal. The same is applicable to the 49th to 96th audio signals. The above mentioned signals are derived from said PCM-TDM processors 91 and 93 of FIG. 6.

The embodiment of said PCM-TDM processor will be explained in detail with reference to FIG. 8. In FIG. 8, reference numerals 113-1 to 113-48 denote audio input signal terminals, and 115 denotes a selecting switch for selecting one of said terminals 113-1 to 113-48. The switch 115 is driven by an audio sampling signal S so as to sequentially select one of said input terminals 113 and to sample the audio input signal sequentially. The whole selecting period of the switch 115 is equal to the inverse number of the sampling frequency of the audio signal, i.e., $(1/10.5) \times 10^{-3}$ sec, so that the rate of changing each input terminal by switch 115 is $$( \frac{1}{10.5} \times 10^{-3}) \ \frac{1}{50} = (1/525) \times 10^{-3} \text{ sec.}$$

The sampled signal is amplified by an amplifier 117. The amplified output is applied to a sample hold circuit composed of a switch 119 and a capacitor 121. The continuous analog output signal from the amplifier 117 is sampled by the switch 119 and the thus sampled signal is held (as a constant value) during a given period by the capacitor 121. The signal held by the capacitor 121 is applied to a differential amplifier 123 in which said sample-hold signal and the output from a weighting resistor circuit 125 are differentially amplified. The differential output signal from the amplifier 123 is applied to a polarity decision circuit 127. The output of this circuit 127 is supplied to a PCM output terminal 129 and to a register 131 for storing the output PCM signal temporarily. The register outputs are supplied to a switch group 133 and control this switch group. Said weighting resistor circuit has many weighting resistors 125-1 to 125-8, each of which has a resistance value of R, 2R, 4R, . . . 128R, respectively, and is connected to said switch group 133. To this switch group 133 is supplied a clock signal $bc$.

When the sample-hold signal is applied to the differential amplifier 123 for the first time, no output signal is obtained from the PCM output terminal 129. Accordingly, no signal is stored into the register 131, so that no signal is applied to the switch group 133. As the switch group 133 does not operate, the output of the weighting resistor circuit 125 is zero potential. In such condition, the differential amplifier 123 operates only as a usual amplifier, so that its output signal is proportional to its input signal. This output signal is supplied to the polarity decision circuit 127 in which it is decided whether this output signal is large or small relative to a given decision level. The decision output thus obtained is the MSD (most significant digit) of the PCM output signal. This decision output signal is stored into the register 131. The PCM output signal stored for the first time, i.e., the MSD signal is applied through the first output 131-1 to the switch group 133 at the timing of the bit clock $bc$. If MSD="1", a constant voltage output is produced from the switch group 133 and is applied to said differential amplifier 123 by the resistor 125-1 of the weighting resistor circuit 125. If MSD="0", the output of the weighting resistor circuit 125 remains zero potential. Here, for the description hereinafter, MSD assumes to be 1. The constant voltage of the output of the circuit 125 can be varied by the voltage supplied from the switch group 133 and in this case, the constant voltage is present to be a half of the maximum value of the output of said capacitor 121. Then the differential amplifier 123 amplifies the difference of two inputs, so that this amplifier 123 produces a voltage shifted (or decreased) by a half of the maximum level. This voltage is compared with the decision level in the circuit 127 so as to produce a second PCM output, i.e., a second significant digit. This PCM output is stored in said register 131. This stored PCM output is applied through the second output 131-2 to the switch group 133 so as to produce a constant voltage by the resistor 125-2. This resistor 125-2 has a resistance value 2R which is larger than that of the resistor 125-1, so that the voltage produced by the resistor 125-2 is a half of the voltage produced by the resistor 125-1.

If the second PCM output is also 1, the voltage obtained from the weighting resistor circuit 125 becomes three-fourths ($\frac{1}{2} + \frac{1}{4} = \frac{3}{4}$) of the maximum voltage held by said capacitor 121. This newly obtained voltage is applied to the differential amplifier 123 and subsequently to the polarity decision circuit 127 so as to decide the PCM sign. The same process is repeated until the register 131 is fully stored. After fully storing, PCM processing of one audio signal is completed. During this PCM processing the signal held by said capacitor 121 is required to be constant. Otherwise, the reference level of the early decision differs from that of the last decision, and this difference causes signal distortion. Hence, the signal from the capacitor 121 must be held at a constant value during PCM processing of one audio signal.

After the above PCM processing, said selecting switch 115 is changed to the next input terminal 113-2, and the audio signal of the second channel is passed to the amplifier 117. The output signal of the amplifier 117 is processed in the same way as above.

The same is applied to all of the 48 channels of audio signals by sequentially changing the selecting switch 115.

For the above switches, amplifier and so on, usual integrated circuits can be employed, such as DG506 for the switch 115, G150 for the switch 119, DG501 for the switch 133, $\mu$A709 for the amplifiers 117 and 123, $\mu$A710 for the polarity decision circuit 127, 9300 for the register 131, and so on.

In FIG. 6, the AND gates 95, 97, 99, 101 divide the signals $a_1$ and $a_2$ (shown in FIG. 5c) to the parts $a_{1-1}$, $a_{1-2}$, $a_{2-1}$ and $a_{2-2}$ and rearrange these parts as shown in FIG. 5c. That is, the part $a_{1-1}$ passed through the gate 95 is delayed by two frame periods (2F=2/30 sec.) by the delay circuit 103 so as to produce the signal A ($a'_{1-1}$). The part $a_{2-1}$ passed through the gate 101 is delayed by one frame period by the delay circuit 105 for producing the signal C ($a'_{2-1}$). The part $a_{1-2}$ passed through the gate 97 and the part $a_{2-2}$ passed through the gate 99 are combined by the mixing circuit 107 to produce the signal B. By shifting the parts $a_{1-2}$ and $a_{2-2}$ by one frame period which is equal to the time length of the part $a_{1-2}$, the parts $a_{1-2}$ and $a_{2-1}$ can be connected without any time gap or without overlapping. These three signals A, B and C are processed only by delaying and rearranging, so that the pulse repetition frequency of these signals A, B and C is not varied and maintains 4.116 MHz. The gate pulses supplied to said AND gates 95, 97, 99 and 101 are shown in FIGS. 9a–9f.

These three signals A, B and C are applied to the time division multiplexer 109 in which the pulse width of each signal is compressed to one third of the original width and two thirds thereof is kept blank and reserved for the remaining two signals which are interposed into this blank period. By this compressing process, the pulse repetition frequency becomes 12.348 MHz which is a value of three times of said frequency 4.116 MHz. This process is shown in FIGS. 10a–10c. As clearly shown in FIGS. 10a–10c, the pulses of said three pulse signal trains, A, B and C are extracted from these pulse trains in time sequence of A, B and C, such as $A_1$, $B_1$, $C_1$, $A_2$, $B_2$, $C_2$ . . . , and are arranged in series. The above process for obtaining the time division multiplexed output signal is clear from the pulse arrangement of FIGS. 11a–11e.

FIG. 11a shows two series of PCM-TDM signals $a_1$ and $a_2$ produced from said PCM-TDM processors 91 and 93. FIG. 11b shows said three signals A, B and C applied to said time division multiplexer. The signal A, B or C has 700 PCM frames (1f–700f), one of which has, as shown in FIG. 11c, three synchronizing signals, $S_A$, $S_B$ and $S_C$ occupying one PCM channel and audio PCM signals each of which has 48 PCM channels 1-1, 2-1 . . . 48-1 . . . 1-701, 2-701 . . . 48-701, 49-1, 50-1 . . . 96-1, 49-701, 50-701 . . . 96-701. The PCM channel of FIG. 11c has eight bits as shown in FIG. 11d. The signals A, B and C thus composed are multiplexed in time division by the time division multiplexer 109 so as to derive the signal shown in FIG. 11e in which the respective bits of the signals A, B and C are alternately adjacent to each other in time division.

The multiplexed signal from the multiplexer 109 is converted to the four-level signal by the two-four level converter 111. The reason for converting the level of the PCM pulse signal will be explained hereinafter.

The output pulse produced from the TDM processor 109 is a binary form, so that the pulse repetition frequency becomes higher, for example 12.348 MHz in the case of FIG. 11 and that transmission frequency band becomes broader as the information to be transmitted increases. Accordingly, the binary pulse form is not suitably applied to the television broadcasting system having a given restricted transmission frequency band. Considering the above, in order to improve the amount of the information to be transmitted, the multi-level pulse transmission system can be utilized. In case of a four level pulse, the pulse repetition frequency can be reduced to a half of 12.348 MHz, i.e., 6.174 MHz.

In order to form the four-level pulse, two continuous binary pulse trains or two independently formed binary pulse trains are suitably combined. In FIG. 11, the pulse train of 12.348 MHz has been formed, so that the pulses are alternately extracted so as to combine with the remaining pulses.

In the two-four level converter 111 in FIG. 6, the pulse amplitude of one of said two pulse series is decreased to be a half of the pulse amplitude of the other and thereafter the two pulse series are added to one another in synchronism so as to obtain the four-level pulse. The pulse repetition frequency of said four-level pulse is 6.174 MHz.

The one PCM frame (1f) signal in the combined signal in FIG. 11 has three multiplexed portions of 48 channels of the audio information signals each of which is quantized in eight bits for one sample signal and three multiplexed portions of eight bits relating to the synchronizing signal portion, so that the 1f signal is totally composed of 600 bits of information.

In a practical transmitting signal, the audio information signal in the 1f signal is the same as the above, while the synchronizing signal portion is composed of 48 bits, i.e., twice the bits of the above bits.

Thus, said 1f signal has the total bits of 624. According to the monochrome television standard in which the horizontal synchronizing frequency is 15.75 KHz, said pulse repetition frequencies 12.348 MHz and 6.174 MHz are respectively changed to 13.104 MHz and 6.552 MHz. According to the present color television standard in which the horizontal synchronizing frequency is 15.734 KHz, said frequencies 12.348 MHz and 6.174 MHz are respectively changed to 13.0909 MHz and 6.5454 MHz. The following explanation will be in conformity with the monochrome television standard.

The apparatus for reproducing the original audio signal from the transmitted signal as shown in FIG. 5d and produced by the arrangement of FIG. 6 will now be shown in FIG. 12. This apparatus corresponds to the audio reallocation processor 81 in FIG. 3.

A four-two level converter 135 receives the transmitted four-level PCM signal and converts it to a two-level signal. The converted two-level signal is applied to a pulse rate converter 137 in which the received signals A, B and C are divided to one another again and the pulse rate of these signals are reduced to a third of the received one. The output signal from said converter 137 is applied to a channel gate 139 which is controlled by a channel selector 141 so as to extract the signal contained in a time slot corresponding to a desired channel. The gated signal from this gate is discriminated whether this gated signal corresponds to the signal A, B or C. In case of this signal corresponding to the signal A or C, this gated signal is directly supplied to a mixing circuit 143 without passing through delay circuits 145 and 147. If the gated signal corresponds to the signal B, this signal is discriminated whether it corresponds to the signal $a'_{1-2}$ contained in the former half of the audio transmission period or to the signal $a'_{2-2}$ related to the latter half thereof. In case of corresponding to the signal $a'_{1-2}$, the gated signal is applied to the two-frame-period delay circuit 147. In case of corresponding to the signal $a'_{2-2}$, the gated signal is applied to the one-frame-period delay circuit 145. The outputs of these delay circuits 145 and 147 are connected to the mixing circuit 143. In this way, by the process already explained with reference to FIG. 4d, the original signal $a_1$ or $a_2$ is reproduced from the output terminal of said mixing circuit 143. As the reproduced signals $a_1$ and $a_2$ are still PCM digital signals, these signals are converted to analog signals by a digital-to-analog converter so as to reproduce a usual audio signal.

In the above-mentioned still picture-audio PCM multiplexing transmission system, the delay lines are utilized to convert the plurality of continuous signals, i.e., the original audio signals to the transmitting signals which are the TDM signals in the form of four-level signals. In such a case, it is necessary that the plurality of continuous signals such as 96 channels of original audio signals are applied to the plurality of the corresponding input terminals in parallel and simultaneously. Accordingly, the above transmission system is adopted to the purpose of transmitting much information in multiplexed form, but this system has a drawback in that this system is less flexible in the point of input signals to be applied because it is not possible to apply input signals independently to one another.

SUMMARY OF THE INVENTION

The present invention relates to a signal editing and processing apparatus in which a plurality of channels of continuous signals, especially long term continuous audio signals respectively relating to still picture signals, are converted or edited to a transmitting multiplexed signal in which signal transmission periods and pause periods having an integer ratio of time duration with each other alternately provided.

The present invention has for its object to provide a signal editing and processing apparatus which can edit the continuous signals to the transmitting multiplexed signal formed by a comparatively simple editing process and restored by a simple processing apparatus and to which a plurality of channels of input continuous signals are not required to be applied in parallel and simultaneously but can be applied independently with each other.

It is another object of the invention to provide an editing and processing apparatus which can edit the continuous signals to the transmitting multiplexed signal formed by a comparatively simple editing process and restored by a simple processing apparatus in the still picture transmission system of the kind described in the preamble of this specification.

It is still another object of the invention to provide an editing and processing apparatus which can economically edit the continuous signals to the transmitting signal by utilizing effectively a magnetic disc video recorder which also has a function of a mass storage capacity memory.

It is further another object of the invention to provide an editing and processing apparatus which multiplexes digital coded signals derived from the analog-to-digital conversion of the plurality of channels of continuous signals in the form of multi-level signals so as to adapt suitably said continuous signals to the mode of the transmitting signal in the editing process.

It is further another object of the invention to provide an editing and processing apparatus for editing a plurality of channels of continuous signals to a transmitting signal in which signal transmission periods and pause periods having an integer ratio with each other are alternately provided, and in which any other signals, especially still picture signals, can be trasmitted during the pause periods.

In order to achieve these objects, the present invention provides a signal editing and processing apparatus for transmitting repeatedly a plurality of continuous signals which are separately produced through a transmission line composed of a plurality of channels in which signal transmission periods and pause periods having an integer ratio of time duration with each other are alternately provided, and said apparatus comprises an analog-to-digital converter for converting sequentially each of said continuous signals to a digital output signal, a first memory for containing the digital output signals in given memory positions having a respective address determined in accordance with the relevant continuous signals so as to store temporarily all of said digital signals in said memory, means for extracting digital signals which correspond respectively to given signal transmission periods of the transmitting signals from the stored digital signals, a second memory for containing said extracted digital signals to be arranged in a plurality of memory positions corresponding respectively to given signal transmission periods of the transmitting signal, means for reading out the digital signals thus arranged in a given sequence with a given speed, required for the signal transmission, a third memory for sequentially storing the read-out digital signals in the given sequence, means for reading the digital signals stored in the third memory with the given speed repeatedly at a given timing required for the signal transmission, and means for transmitting said read-out digital signals repeatedly.

BRIEF DESCRIPTION OF THE DRAWINGS

The present invention will be completely understood by reference to the following detailed description, taken in conjunction with the accompanying drawings, in which:

FIGS. 1a – 1d show formats of a master frame, a sub-frame, a video-audio frame, and a portion of said frame, respectively, of a video-audio signal to be transmitted, and FIG. 1e shows a principle of the allocation of an audio PCM signal in the still picture transmission system to which reference has already been made in the discussion of the background of the invention;

FIG. 2 is a schematic diagram an embodiment of the transmitting apparatus in the still picture transmission system, wherein the still picture and PCM audio signal are multiplexed in time division;

FIG. 3 is a block diagram embodying the receiver in the above signal transmission system;

FIGS. 4a – 4o show various waveforms of the signals at many parts of the receiver of FIG. 3;

FIG. 5a shows a principle of the basic signal combination in the still picture transmission system, FIG. 5b shows a principle of the basic signal separation in said system, FIG. 5c is an explanatory diagram of one embodiment of the combination of actual audio signals, and FIG. 5d is an explanatory diagram of one embodiment of the separation of the signal thus combined;

FIG. 6 is a block diagram of one embodiment of the transmitting apparatus for processing the audio signals by the principle of FIG. 5c;

FIGS. 7a and 7b show signal formats for explaining the relation between television frame F and PCM frame $f$ of the PCM-TDM output signal;

FIG. 8 is a schematic diagram of one embodiment of the PCM-TDM processor in FIG. 6;

FIG. 9 shows timings of the gate signals applied to the gates of FIG. 6;

FIGS. 10a – 10d show waveforms for explaining the process of multiplexing three signals per bit unit in time division;

FIG. 12 is a block diagram of an embodiment of the audio reallocation processor in FIG. 3, and reference has already been made to FIG. 2 – FIG. 12 in the discussion of the background of the invention;

FIG. 13 is a block diagram of a basic construction of the audio signal editing apparatus according to this invention;

FIG. 14a illustrates the signal within one master frame MF period, FIG. 14b illustrates video frame VF and audio frame AF of video-audio frame VAF, FIGS. 14c and 14d illustrate signal arrangements within one of the PCM frames in the respective first and second audio frames $A_{ij\text{-}1}$ and $A_{ij\text{-}2}$ in the video-audio frame VAF;

FIG. 15a illustrates audio signals to be transmitted in respective master frames, FIG. 15b illustrates channel numbers designated to respective master frames, FIG. 15c shows the relation between channel number and time slots, FIG. 15d shows the arrangement of the video-audio frames VAF in one master frame MF, FIGS. $15e_0$, $15e_2$, ..., $15e_{94}$ and FIGS. $15f_1$, $15f_3$, ..., $15f_{95}$ show respectively the signals transmitted through the even channels and the odd channels;

FIG. 16 is a block diagram of an embodiment of means for producing an audio input signal and means for producing the data for operating the computer through the operation program in FIG. 13;

FIGS. 17a – 17f illustrate examples of waveforms for explaining the operation of the apparatus shown in FIG. 16;

FIG. 18 is a block diagram of an embodiment of means for storing the audio signal in the form of a digital signal together with a control signal in the digital memory in FIG. 13;

FIGS. 19a – 19j illustrate time charts for explaining the procedure of signal processing according to this invention;

FIG. 20 is a block diagram of a detailed embodiment of the apparatus for controlling the signal arrangement conversion memory in FIG. 13;

FIG. 21 is a block diagram of another embodiment of the editing apparatus according to the invention in which the digital memory in FIG. 13 is omitted; and FIG. 22 is a block diagram of a further embodiment of the audio signal editing apparatus according to this invention.

DESCRIPTION OF PREFERRED EMBODIMENTS

Figure 11:
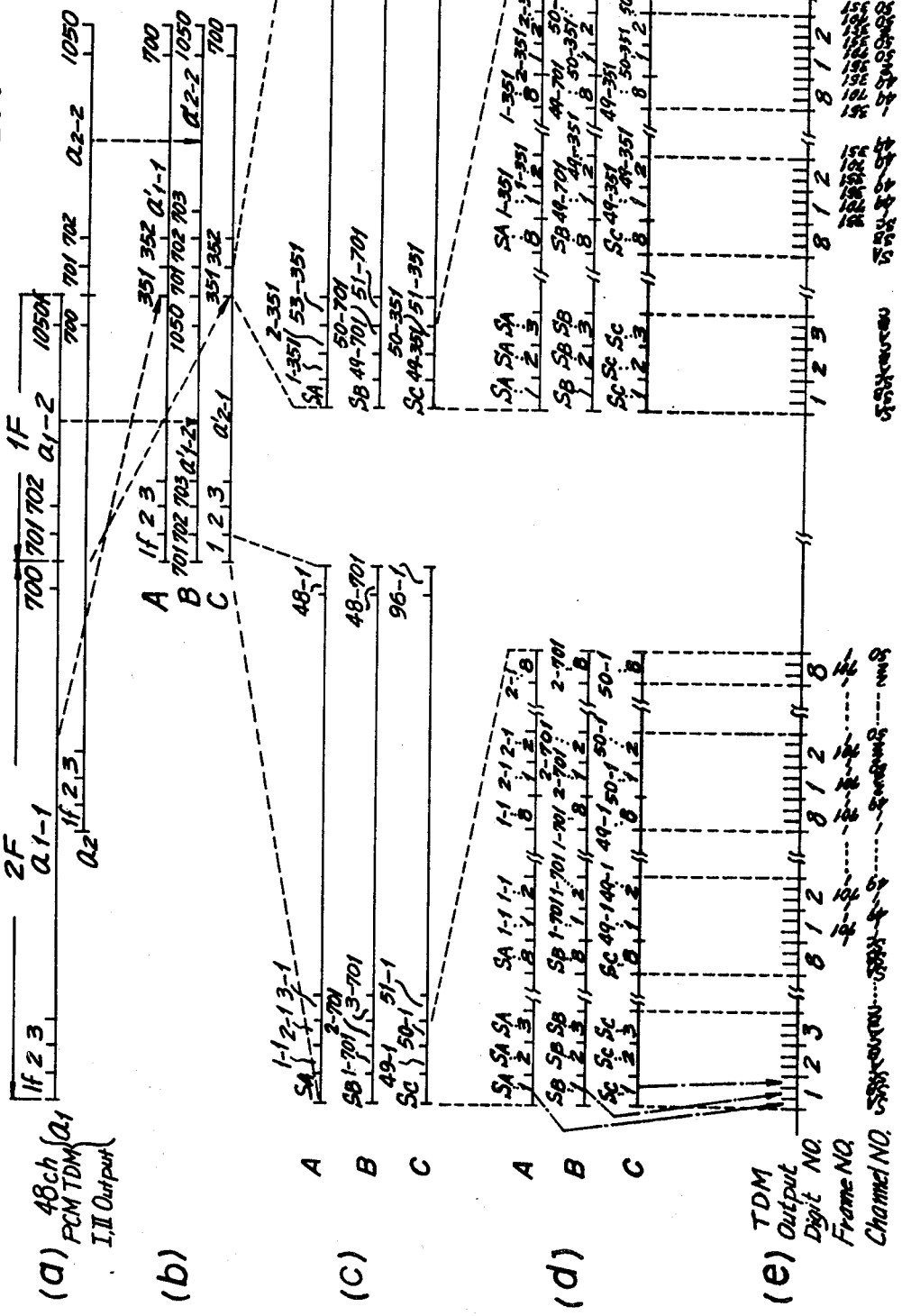
FIGS. 11a – 11e show a pulse arrangement of the actual multiplexed signal in case of multiplexing three signals per bit unit in time division.

Now, a signal converting, i.e., editing and processing apparatus according to this invention will be explained. In the following, as an embodiment of this apparatus, explanation will be made about an audio signal editing apparatus embodying this invention for the still picture and audio broadcasting system wherein the still pictures and the audio signals related thereto are transmitted as mentioned above.

Referring to the drawings, there is shown in FIG. 13 a basic construction of the audio signal editing apparatus embodying this invention. This apparatus shown in FIG. 13 operates in the same manner as that shown in FIG. 6 by employing an electronic digital computer. In FIG. 13, an audio input signal 151 is applied to an analog-to-digital converter 153 in which said input signal 151 is converted to a digital signal 155. This digital signal 155 is stored in a digital memory 157 via a digital computer 159. Said memory 157 has a large capacity of storage so as to store many audio signals. After storing all audio signals having audio signals to be multiplexed in said memory 157, a data processing is effected by an operation program 161 which gives an instruction to the computer 159 so as to make spaces or vacancies in the audio signals in order to insert still picture transmission periods. For said data processing an auxiliary memory 163 for converting signal arrangements is added. Derived from said memory 163 is a multiplexed signal 165 having a time interval dependent on the storage capacity of the memory 163. Said multiplexed signal 165 is sequentially stored in a high speed memory 167 for transmitting signals so as to form a series of signals. While the memory 167 is in read-out cycle, a reproduced output signal 169 is obtained. This signal 169 corresponds to the signal shown in FIG. 7.

In the apparatus shown in FIG. 13, a plurality of channels of audio signals are sequentially converted to quantized digital signals 155 which are stored in the digital memory 157. Then, after completion of the storage of said digital signals, the content thus stored is edited or rearranged so as to produce the transmitting signals sequentially. By reading out the content of the high speed memory 167 in a repeated manner, it is possible to transmit repeatedly the signal having the same content, so that it is clear that the apparatus according to the invention is preferably adapted to the case in which a programmed broadcasting content is kept to be broadcasted during a given period.

The operation of the apparatus will be exampled in detail in the following.

In case of the still picture and audio PCM signal transmission system described in the above, the audio sample frequency is two thirds of the horizontal synchronizing frequency of the video signal, i.e. 10.5 KHz, and the number of the PCM multiplexed time slots is chosen to be 144. Two thirds of the time slots, i.e. 96 time slots are allotted to the transmission of $a'_{1-1}$ and $a'_{2-1}$ shown in FIG. 5c, and the remaining time slots, i.e. 48 time slots are allotted to the transmission of $a'_{1-2}$ and $a'_{2-2}$. Hence, 96 channels are used for the transmission of multiplexed PCM signals. Since the repetition period is 5 seconds, the time required for transmitting audio signals is 480 seconds, so that it is clear that each of 45 still pictures may be accompanied by an audio signal having an average duration of 10 seconds. The duration of the actual audio signal is varied in accordance with the content thereof, so that in order to transmit the audio signals effectively it is necessary to allot a plurality of audio signals into the same time slot in time division mode. Such a usage of the time slot can be realized by composing a control signal so as not only to function the choice and display of the still picture, the choice and extraction of the audio signal, and the selection of reproduction, but also to control the display and reproduction.

FIG. 14a illustrates the signal within one master frame MF period, which signal is repeatedly transmitted in case of program service. The master frame MF has a time duration of 5 seconds and is equally divided into five sub-frames $SF_0$–$SF_4$ having a duration of one second. Each sub-frame is equally divided into 10 video-audio frames VAF, each of which has a duration of 0.1 second so that there are 50 video-audio frames $VAF_{00}$–$VAF_{49}$ in one master frame MF. The video-audio frames $VAF_{01}$, $VAF_{20}$ and $VAF_{49}$ indicate the second VAF of $SF_0$, the first VAF of $SF_2$ and the last or tenth VAF of $SF_4$, respectively.

FIG. 14b illustrates video frame VF and audio frame AF of video-audio frame VAF. The first two suffix numbers represent the corresponding video-audio frame VAF and the suffix numbers 1 and 2 after the hyphen represent the first and the second audio frames, respectively.

FIGS. 14c and 14d illustrate signal arrangements within one of the PCM frames in the respective first and second audio frames $A_{ij-1}$ and $A_{ij-2}$ in said video-audio frame VAF. In one audio frame $A_{ij-1}$ or $A_{ij-2}$ there are 350 PCM frames, and one PCM frame has a time duration equal to 95 $\mu$sec and has a SYNC & CONTROL portion and 144 time slots. The SYNC & CONTROL portion is inserted in the position of the frame synchronization and has a time duration equal to the time duration of 12 time slots. As already described, the audio signal within one audio frame period $A_{ij-1}$ or $A_{ij-2}$ is sampled 350 times, i.e. there are 350 PCM frames in one audio frame. The audio sampling periods of each audio frame $A_{ij-1}$ or $A_{ij-2}$ are represented by $S_{000}$–$S_{349}$. The 144 time slots in one PCM frame are represented by $PWD_{000}$–$PWD_{143}$. Then, any time slot in the master frame MF can be indicated by the expression of the alphabets and the numerals such as "$A_{31-1}.S_{40}.PWD_{008}$" which represents the ninth time slot in the 41st PCM frame in the first audio frame of the $VAF_{31}$ in the fourth sub-frame $SF_3$. By using such a naming, it is possible to distinguish and to indicate the respective quantized digital signals of the audio signal which lasts 480 seconds in the transmission signals.

FIG. 15 shows a process of editing the audio signal in which a plurality channels of audio signals having a duration of 480 seconds are converted to digital signals and rearranged to the transmitted signal.

FIG. 15a illustrates audio signals to be transmitted in respective master frames, composed of a plurality of audio material groups, and having a total duration of 480 seconds. These audio signals are divided into 96 master frames $MF_{00}$–$MF_{95}$ each of which has five seconds. Each five-second audio signal can be transmitted by one specific channel among the audio channels multiplexed in time division PCM during the audio signal period, i.e. by one specific time slot PWD corresponding to each channel. Further, considering that there may be audio materials having a time length longer than 5 seconds, these materials are arranged sequentially in the common channel so as to facilitate the operation of the reproduction at the receiving side, i.e. the reproduction with interpolation of the video period between audio periods. Accordingly, the first half group of said master frames during 480 seconds, i.e. $MF_0$–$MF_{47}$ are sequentially allocated to the even channels $CH_0$, $CH_2$, $CH_4$, ..., $CH_{94}$, and the second half group $MF_{48}$–$MF_{95}$ are sequentially allocated to the odd channels $CH_1$, $CH_3$, $CH_5$, ..., $CH_{95}$, as shown in FIGS. 15a and 15b. FIG. 15c shows the relation between said allocation and the time slots PWD.

FIG. 15d shows the arrangement of the video-audio frames of one master frame MF. FIGS. $15e_0$, $15e_2$, ..., $15e_{94}$ and $15f_1$, $15f_3$, ..., $15f_{95}$ show respectively the signals transmitted through the even channels $CH_0$, $CH_2$, ..., $CH_{94}$ and the odd channel $CH_1$, $CH_3$, ..., $CH_{95}$. For example, FIG. $15e_0$ shows the time slots $PWD_{000}$ and $PWD_{001}$ which are transmitted through the channel $CH_0$ in the corresponding audio frames $A_{00-1}$, $A_{00-2}$, $A_{00-1}$, $A_{01-1}$, $A_{01-2}$, $A_{01-1}$, ... Also, FIG. $15f_1$ shows the time slots $PWD_{002}$ and $PWD_{001}$ which are transmitted through the channel $CH_1$ in the corresponding audio frames $A_{00-1}$, $A_{00-2}$, $A_{00-2}$, $A_{00-1}$, $A_{01-2}$, $A_{01-2}$, ...

In such a case, 350 times of samplings are effected every one television frame period, i.e. $A_{ij-1}$, $A_{ij-2}$ or $V_{ij}$ so that the 5 second audio signal is sampled 52500 times since this signal has 150 (3×50) television frames. The samples corresponding to the first and second audio frames $A_{ij-1}$ and $A_{ij-2}$ are sequentially arranged to, for example in case of $MF_{01}$, the relevant time slots $PWD_{003}$ which correspond to the channel $CH_2$ for transmitting the PCM-frames in the master frame $MF_{01}$ (FIGS. 15a, b and c). The samples corresponding to the video signal transmission period $V_{ij}$ are sequentially arranged to the time slots PWD which are located in the first or second television frame period in the preceding audio frame $A_{ij-1}$ or $A_{ij-2}$ according to whether the relevant channel is even or odd. In the above example, the relevant channel $CH_2$ is even, so that the samples are arranged into the time slots $PWD_{004}$ in the first audio frame $A_{ij-1}$ sequentially.

In such a signal arrangement, every sampled and quantized signal in the auio signal having the time duration of 480 seconds in FIG. 15a corresponds to each specific time slot PWD in FIGS. 14c and 14d. That is to say, the first to 349th quantized signals obtained by sampling 350 times in $MF_{01}$ in FIG. 15a correspond sequentially to the time slots $A_{00-1}.S_0.PWD_{003}$ to $A_{00-1}.S_{349}.PWD_{003}$, the 350th to 699th quantized signals to the time slots $A_{00-2}.S_0.PWD_{003}$ to $A_{00-2}.S_{349}.PWD_{003}$, the 700th to 1049th quantized signals to the time slots $A_{00-1}.S_0.PWD_{004}$ to $A_{00-1}.S_{349}.PWD_{004}$, the 1050th to 1399th quantized signals to the time slots $A_{01-1}.S_0.PWD_{003}$ to $A_{01-1}.S_{349}.PWD_{033}$, the 1400th to 1749th quantized signals to the time slots $A_{01-2}.S_0.PWD_{003}$ to $A_{01-2}.S_{349}.PWD_{003}$, the 1750th to 2099th quantized signals to the time slots $A_{01-1}.S_0.PWD_{004}$ to $A_{01-1}.S_{349}.PWD_{004}$, and so on. The same is applicable to the 150 television frames, and therefore the time slots $PWD_{003}$ in the audio frames $A_{00-1}$, $A_{00-2}$, ..., $A_{49-1}$, $A_{49-2}$ and the time slots $PWD_{004}$ in the audio frames $A_{00-1}$, $A_{01-1}$, ..., $A_{48-1}$, $A_{49-1}$ contain the audio signal of the second master frame $MF_{01}$, i.e. the second 5 seconds of audio signal. The relations between the master frame and the channel and between the channel and the time slot will be summarized in the following Table 1.

Table 1

| Master Frame (5 sec) | Channel | Time slot | |
|---|---|---|---|
| MF00 | CH00 | PWD000 | PWD001 |
| MF01 | CH02 | PWD003 | PWD004 |
| MF02 | CH04 | PWD006 | PWD007 |
| MF03 | CH06 | PWD009 | PWD010 |
| MF04 | CH08 | PWD012 | PWD013 |
| MF05 | CH10 | PWD015 | PWD016 |
| MF06 | CH12 | PWD018 | PWD019 |
| . | . | . | . |
| MF28 | CH56 | PWD084 | PWD085 |
| . | . | . | . |
| MF46 | CH92 | PWD138 | PWD139 |
| MF47 | CH94 | PWD141 | PWD142 |
| MF48 | CH01 | PWD002 | PWD001 |
| MF49 | CH03 | PWD005 | PWD004 |
| MF50 | CH05 | PWD008 | PWD007 |
| . | . | . | . |
| MF90 | CH85 | PWD128 | PWD127 |
| . | . | . | . |
| MF94 | CH93 | PWD140 | PWD139 |
| MF95 | CH95 | PWD143 | PWD142 |

The total capacity of information transmission can be determined by the formation of the transmitting signal mentioned above. The signals to be transmitted can correspond to the specific position in the transmitting signal respectively, so that it is possible to edit and process the audio signals for producing a transmitting signal by the configuration shown in FIG. 13 which is different from the embodiment shown in FIG. 12.

Prior to explaining this processing with reference to FIG. 13, the quantity of digital information obtained when the analog audio signals having the time duration of 480 seconds are converted to the digital signals will be estimated roughly here.

When the sampling frequency in case of analog to digital conversion is chosen to be 10.5 KHz and the bit numbers in case of quantizing each sample are chosen to be eight, then the total bit numbers produced during 480 seconds is determined as follows.

$$8[\text{bit/sample}] \times 10.5 \times 10^3[\text{sample/sec}] \times 480[\text{sec}] = 40.32 \times 10^6[\text{bit}].$$

That is to say, the total bit numbers required are 40.32 Mbits, so that it is necessary that said digital memory 157 has a capacity larger than 40.32 Mbits. The same is applicable to the high speed memory 167. In case of the signal formation illustrated in FIG. 14, there are 156 time slots in one sampling period, and the 12 time slots among the 156 time slots contain the signals of synchronization and control, etc., and each of the remaining 144 time slots contains eight bits of digital information. Accordingly, the information rate is determined as follows.

$$8[\text{bit/time slot}] \times 156[\text{time slot/sampling period}]$$

$$\times 350[\text{sampling period/frame}]$$

$$\times 30[\text{frame/sec}]$$

$$= 13,104 \times 10^3[\text{bit/sec}].$$

This information rate is obtained in case of a two-level signal, so that in case of the actual four-level signal the fundamental frequency is equal to 6.552 MHz (=½×13,104 KHz). It is essential that this information transmission rate coincides with the information transferring rate of the high speed memory 167 in FIG. 13. For the memory 167, it is necessary that this memory 167 can store even the video signal fulfilling the NTSC system of Color Television and also that the same still picture and audio signals are reproduced from the memory 167 at every 5 second.

One example of the high speed memory 167 in FIG. 13 is a video disc recorder. This video disc recorder should have such functions that each track of the disc records each one field signal of the color television signal in conformity with the NTSC system of Color Television and having a time duration equal to 30 seconds and that each track is sequentially reproduced with the reproducing rate equal to or less than the recording rate. In order to record and reproduce the PCM multiplexed digital signal, it is necessary to reform and add the characteristics and the functions of the video disc recorder. The main points of said reformation and addition are as follows.

1. To add a function of recording and reproducing one field or one frame signal. This function is required for solving the following technical problem and the manufacturing cost. That is, it is necessary to contain each frame of the pictures separately picked up by such as the color telecinecamera in accordance with said signal formation into a given track of the disc in case of recording the video signal with the disc recorder. Also, it is difficult to make the rate of the signal transfer under control of the computer equal to the information rate required finally when multiplexing the audio signals in the form of the PCM signal and further it is difficult to make the length of one block for transferring data less than one field.

2. To add a function of designating arbitrarily the track for recording and reproducing. As mentioned above, said disc recorder has a storage capacity for recording the video signals having a time duration of 30 seconds, and this 30 seconds correspond to 900 television frames, so that there are 1,800 tracks in total. In order to obtain a transmitting signal having a time duration of 5 seconds, it is necessary to contain this signal into 150 frames, i.e., 300 tracks. Thus, it is required that any given 300 tracks among the total 1,800 tracks are available for containing said signal of 5 seconds arbitrarily.

3. To modify the mode of control and detection of the jitter compensation apparatus.

The magnetic disc of the disc memory is rotated mechanically, so that the rotation of the disc is not constant. Therefore, it is necessary to control the synchronization of said rotation and to compensate for the jitter with the modulation of the information transmission rate by the usage of an element for varying the delay time, so that in case of the sole television signal the jitter is detected by the color subcarrier signal. On the other hand in case of a still picture transmission system it is necessary to detect the jitter by using the bit clock signal (6.552 MHz) of the multiplexed PCM signal, since the color subcarrier signal is not transmitted through the signal during the audio transmission period. Further, it is required to eliminate the residual jitter which increases the demodulation error of the PCM signal.

Now, considering the processing apparatus shown in FIG. 13 again, said memory 163 for converting the signal arrangement is the digital memory for the purpose of coincidence of said two information signal transmission rates in an economical way. This digital memory 163 can be composed of a high speed core memory, IC memory and so on. In the apparatus of this embodiment, the core memory is employed for the digital memory 163. Since the block in which the recorded signal is transferred is one field period in said video disc memory, the required memory capacity thereof is determined as follows, inclusive of the 12 time slots for containing the synchronizing and control signals.

$$8[\text{bit/time slot}] \times 156[\text{time slot/sampling period}]$$

$$\times (350/2) [\text{sampling period/field}]$$

$$= 218,400[\text{bit/field}].$$

On the other hand, most kinds of core memories transfer the signal in each word unit. In this embodiment, since one word is formed with 16 bits of signal, said 218,400 bits of signals correspond to 13.65 kilowords, so that said core memory has the capacity of 16 kilowords. Since one word (i.e. 16 bits of signal) is transferred in parallel, it is enough that the core memory has a read-out speed equal to 1/16 of said information speed 13,104 [kilo bit/sec], so that the core memory is so constructed as to read out the recorded signals therein by the read-out pulse obtained by frequency division and having a frequency equal to one eighth of the bit clock frequency 6,552 KHz.

Considering the above, the construction and operation of the audio signal editing and processing apparatus embodying the present invention and shown in FIG. 13 will be again explained in more detail.

In FIG. 13, the analog audio input signal 151 is converted to the digital signal by the analog to digital converter 153 in which the sampling frequency is 10.5 KHz. The converter 153 produces the output signals each of which has eight bits per one sample. Two samples of said output signal form one word which is transferred to the computer 159. To the computer 159 said converted digital data are transferred until the quantity of the transferred data becomes equal to that of one block of said large capacity memory 157, i.e. until the memory 157 overflows, and the transferred data are contained in the internal memory of the computer 159. When the transferred data become equal to one block of transferring quantity, the relevant data are transferred from the internal memory of the computer 159 to the digital memory 157. As the memory 157, for example, the magnetic disc apparatus having a capacity equal to 40.96 Mbits may be employed. In this case, the transferring rate between the computer 159 and the memory 157 is about 64 kilo word/sec. The audio signal having a time duration of 480 seconds is contained in the memory address locations on the disc pack (the memory 157) after arranging said audio signal so as to be contained in the corresponding time slots in the transmitting signal as already explained with referring to FIGS. 14 and 15. If the audio signal of 480 seconds is completely accommodated into the disc pack 157, then the information corresponding to the audio information in each of the fields during the audio transmission period in the transmitting signal is read out from the disc pack 157. The read-out information is arranged by the editing process mentioned above and thereafter stored. The above respective operations are, of course, controlled in accordance with the software of the operation program 161 by the computer 159 to which said software is applied. If the whole audio information of one field is completely stored in the memory 163, this information which are the two-level signals is converted to the four-level signals and then recorded to the predetermined tracks in the high speed memory (the video disc recorder) 167. In such a way, the respective one-frame signals of the audio informations on the disc pack 157 are sequentially recorded into the video disc recorder 167 until these one-frame signals fulfill 200 tracks.

The audio signal of 480 seconds is thus recorded in the video disc recorder 167, while the video signal is also recorded on given tracks, so that the transmitting signal as mentioned above is obtained by reproducing these audio and video signals.

A more detailed embodiment of the apparatus shown in FIG. 13 will be explained with reference to FIGS. 16–20.

FIG. 16 shows an embodiment of means for producing the audio input signal 151 and means for producing the data for operating the computer 159 through the operation program 161.

In FIG. 16, the reference numerals 201, 203 and 205 denote respectively a microphone, a preamplifier and a tape recorder for reproducing the audio tape already recorded. The output signals from said preamplifier 203 and said tape recorder 205 are selectively applied to a low-pass filter 207 through a change-over switch 209 for selecting either one of these two output signals. From the filter 207 an audio signal 211 is obtained in which the undesired frequency band is eliminated. The reference numeral 213 denotes a signal generator which produces a timing signal 215 which is used as a sampling signal in case of pulse code modulating the audio signal, as mentioned above in one embodiment of the still picture transmission system. This signal 215 is applied to a high-pass filter 217 from which a sinusoidal wave signal 219 is derived. Both of the output signals 211 and 219 of said filters 207 and 217 are applied to a mixing circuit 221 so as to mix the audio signal 211 and the sinusoidal wave signal 219. The output signal 223 from the mixing stage 221 is applied to a tape recorder with two channels so as to record the signal 223 in one channel. To the other channel recorded is the signal 227 from a further mixer 229. The reference numeral 231 denotes a controller box having a ten-key switch 233, a starting switch 235, a stopping switch 237 and a clear switch 239. The data 241 from the ten-key switch 233 is applied to a register 243 for storing three digits, the content of which is displayed by the indicator 245. The data stored in the register 243 is applied to a gate circuit 247 which passes cyclicly said data to a code conversion circuit 249 by the timing signal 251 from a counter 253. The code conversion circuit 249 is for converting the number designated by the ten-key switch 233 to a specific combination of two frequencies among seven different frequencies. This code conversion applies the same principle as that of the push-button dial telephone system. For that purpose, a multifrequency oscillator 255 generates the seven signals 257-1 – 257-7 having different frequencies respectively, and these seven signals are applied to the code conversion circuit 249 in which two of seven signals are selected and mixed together. The output signal from the code conversion circuit 249 is applied to said mixing circuit 229 through a low-pass filter 259, to the second input terminal of which the output from a high-pass filter 261 is applied, the detail of which will be explained hereinafter. Furthermore, in FIG. 16, said counter 253 starts counting the number of the timing signals 215 when the counter 253 receives the starting signal 263 from the starting switch 235 in the controller box 231. The counter 253 generates the four digits of counted output signal 265 having the time units of 0.1 second, 1 second, 10 seconds and 100 seconds. This output signal 265 is applied to said gate circuit 247 and to a time indicator 267. Said output signal 251 from the counter 253 occurs when the counter 253 receives the starting signal 263 as well as when receiving the stopping signal 269 from the stopping switch 237 and the signal 251 functions as a timing signal for sequentially passing the data from the register 243 and the counter 253 through the gate circuit 247. The third output signal 271 from the counter 253 is applied to an indicator 273 and to a gating circuit 275 which selects the signals 277 and 279 from said multifrequency oscillator 255. The selected signal 277 or 279 is applied to said mixing stage 229 through said high-pass filter 261. In the mixing stage 229, the output signals from the filter 259 and 261 are mixed, and the mixed output is recorded on the second track of the tape recorder 225. Said output signals 265 and 271 are interrupted by the stopping signal 269, but the output signal 251 is not interrupted by the same signal 269.

The operation of the above arrangement and each component circuit will be further explained with reference to the time chart shown in FIGS. 17a–17f.

The microphone 201 transduces the audio information such as human speech or musical sound into an electric signal. Normally, the transduced electric signal has a level equal to −72 dBm, while the level of the output signal of the tape recorder 205 is −22 dBm, so that there is a great difference in level, i.e. 50 dB. Thus, in order to boost up the level of the microphone 201, the preamplifier 203 is provided. When using the microphone for picking up a voice or sound such as an announcing of a radio script, the switch 209 is switched to the position as shown, and when using a recorded voice or sound or a recorded music, said switch 209 is switched to the reverse position. In this embodiment, only two signal sources are shown for the sake of simplicity, but it is preferably considered that the switch 209 illustrates a kind of an audio mixing apparatus.

In case that the sampling frequency of forming the audio PCM signal is 10.5 KHz, the audio component having a frequency more than a half of said frequency 10.5 KHz causes a noise, so that said low-pass filter 207 is provided for eliminating such a high frequency component. That is to say, this filter 207 is characteristic of reducing the frequency component of more than 5 KHz by at least more than 20 dB.

The timing signal generator 213 produces the timing information 215 for sampling the audio signal. This information is applied to the mixing circuit 221 through the high-pass filter 217 so as to mix with the audio signal 211 passed through the low-pass filter 207 in the form of frequency division multiplexing. The characteristics of the filters 207 and 217 are so determined that the pass bands thereof are not overlapped and in order to pass the timing information of 10.5 KHz sufficiently the cut off frequency of the high-pass filter is determined to be 7.5 KHz. The mixed output signal 223 is recorded into one of the two tracks (which will be referred to as the first track) in the tape recorder 225. The other input signal 227 is recorded on the other track, i.e. the second track.

The reason why the audio signal and the timing signal for sampling are recorded by multiplexing these two signals in frequency division is to improve the stability of recording and reproducing, since the relation of the pattern on the tape between the recorded audio and timing signals is fixed by such a multiplexing, so that the timing position of sampling does not deviate from the specific position relative to the position of the audio signal, even if the tape driving speed of the tape recorder 225 is varied.

Preceding to the above recording, the controller box 231 operates as follows.

Since the audio information of announcement or from a recorded tape forms one program of a still picture broadcasting, it is necessary that the title of the program or the title of the audio material be added to the audio information so as to distinguish that relevant audio information from the other information. So, the controller box 231 has the ten-key switch 233 for designating the title of any audio material in the form of a number with three digits. Once this number is set, then this number is stored in the register 243 in the form of a binary code and also indicated as a decimal number of three digits by the indicator 245. The indicator 245 can be composed of a conventional Nixie tube (trade name) or a numeric indicating IC using such an element as a light emitting diode or a liquid crystal. If the starting switch 235 is pushed after setting up the three-digit number of the desired audio material, the tape recorder 225 starts recording that desired material under remote control (not shown), and the timing information is recorded into the first channel, while the signal 277 from the multi-frequency oscillator 255 is recorded into the second channel through the gate circuit 275 gated by the output signal 271 from the counter 253, the high-pass filter 261 and the mixing stage 229.

The counter 253 starts its counting as soon as it receives the starting signal 263 so as to produce the timing signal 251 which controls the gate circuit 247 in order to read out the stored numbers of the audio materials from the register 243 sequentially. The output signal from the gate circuit 247 is a binary number having four bits and is applied to the code converter 249 in which the binary number is converted to the corresponding decimal number. According to the content of the decimal number, two out of the seven frequencies of the signals 257-1 – 257-7 from the multi-frequency oscillator 255 are selected by the same manner as the push-button dial telephone system. The selected frequencies are applied to the mixing stage 229 through the low-pass filter 259 so as to mix the signal having selected frequencies with the signal passed through the high-pass filter 261. The output signal 227 from the mixing circuit is recorded into the second track of the tape recorder 225.

The logic for selecting any two frequencies out of said seven frequencies depends on the following table 2. Since all of the following frequencies are below 5 KHz, the low-pass filter 259 may have the same characteristic as the low-pass filter 207.

Table 2

| Frequency Number | 670 Hz | 810 Hz | 990 Hz | 1.3 KHz | 2.5 KHz | 3.3 KHz | 4.3 KHz |
|---|---|---|---|---|---|---|---|
| 0 | | | | o | | o | |
| 1 | o | | | | o | | |
| 2 | o | | | | | o | |
| 3 | o | | | | | | o |
| 4 | | o | | | o | | |
| 5 | | o | | | | o | |
| 6 | | o | | | | | o |
| 7 | | | o | | o | | |
| 8 | | | o | | | o | |
| 9 | | | o | | | | o |
| 10 | | | | o | o | | |
| 11 | | | | o | | | o |

Further, in order to indicate that the three-digit number read out from the register 243 represents an audio material, the two frequencies corresponding to the number 10 in the above Table 2 are disposed in front and in the rear of said three-digit number.

When the recording of the number of the audio material is completed, namely when the signal 251 stops, the signal 271 is inverted, so that the gate circuit 275 changes its gate condition so as to pass through the signal 279 instead of the signal 277. And at the same time, the indicator 273 indicates the instruction signal for starting the announcement or the operation of the tape recorder 205 so as to reproduce the audio signal. From that instant, the counter 253 starts its operation for counting the time duration of the audio signal. The time indicator 267 receives the signal 265 so as to display the momentarily changing state of the counting result with the four time units of 0.1 second, 1 second, 10 seconds and 100 seconds in the form of four digits, the same as the indicator 245.

From the instant indicated by the indicator 273, the announcement or the reproducing from the tape recorder 205 starts and the audio signal 211 obtained from either one of the microphone 201 or the tape recorder 205 is recorded into the first channel of the tape recorder 225 through the signal path mentioned above.

When the audio signal 211 is completed, the operator pushes the stopping switch 237 of the controller box 231 so as to produce the stopping signal 269 which stops the counting of the counter 253 and also which interrupts the signal 271 and releases the signal 251. The gate circuit 275 gates out the signal 277 which passes through the high-pass filter 261 so as to inform that the audio signal has been completed. That is to say, the signal 279 represents the audio signal period and the signal 277 representative of the signal period except for the audio signal period, and these signals are to have sinusoidal waves of different frequencies. In this embodiment, the frequencies of the signals 279 and 277 are determined to be 9.7 KHz and 14.5 KHz, respectively, considering the characteristic of the high-pass filter 261. These signals are shown in FIGS. 17c and 17d, but these drawings do not express the actual relation between their frequencies.

The four-digit number representative of the counting state when the counter 253 has stopped its counting is passed through the gate circuit 247 to the code conversion circuit 249 so as to convert said four-digit number to a given combination of two frequencies according to the Table 2, just same as the above-described case of the number of the audio material. The frequency signal thus converted is applied to the mixing circuit 229 through the low-pass filter 259 so as to mix said frequency signal with the signal 277. The mixed output signal is recorded into the second track of the tape recorder 225. Further, in order to indicate that the four-digit number derived from the counter 253 represents a resultant value of time counting, the two frequencies corresponding to the number 11 in the above Table 2 are added in front and in the rear of said four-digit number. After recording the four-digit number representative of the time duration of the audio signal, the tape recorder 225 is stopped by the instruction (not shown) from the counter 253.

Next, the register 243 and the counter 253 are cleared by the clear signal 281 from the switch 239. After such a reset operation the apparatus shown in FIG. 16 terminates a series of its recording procedure and is ready for recording the following audio material.

By repeating the above procedure, the audio signals of many audio materials and the data related thereto for controlling the computer are recorded.

FIG. 18 shows an embodiment of means for storing the audio signal in the form of a digital signal together with the control signal produced by the apparatus of FIG. 16 in the digital memory 157 through the analog-to-digital converter 153 and the computer 159 of the audio signal editing processor shown in FIG. 13 as one embodiment of the apparatus according to the invention.

In FIG. 18, said tape recorder 225 is in the reproducing mode. The output signal 283 reproduced from the first track has the audio signal combined with the timing information. This signal 283 is applied to a low pass filter 285 and to a band-pass filter 287. The audio signal filtered out from the filter 285 is applied to the analog-to-digital converter 153 (in FIG. 13) which samples said audio signal at the timing of the timing signal from the filter 287 so as to convert it into the digital signal. The digital signal 289 thus converted is stored in a sixteen-bit register 291. The content of said register 291 is applied to a gate circuit 293 which determines the timing of tranferring the content of the register 291 to the computer 159 through an interface 295.

The output signal 297 reproduced from the second track is the multiplexed signal of the signals representative of the number and the time duration of the audio material and the signal representative of the audio signal period. This signal 297 is applied to respective band-pass filters 299 and 301. The filter 299 selects said number and the time duration of the audio material, which are decoded to respective corresponding numerical values by a decoder 303. The decoded numerical values are stored in a register 305. The content of said register 305 is applied to a gate circuit 307 which determines the timing of transferring the content of the register 305 to the computer 159 through the interface 295. The filter 301 selects the signal representative of the audio signal period which is applied to a start-stop decision circuit 309 so as to decide the timings of start and stop of said period.

The reference numeral 311 denotes a flag circuit for interrupting the computer 159. The flag circuit receives the signal from the analog-to-digital converter 153, the decoder 305 and the decision circuit 309. The reference numeral 313 denotes an IOC instruction decoder for decoding instructions from the computer 159. The decoded instructions are applied to the tape recorder 225, and to the gating circuits 293 and 307 so as to control their operations.

The above apparatus shown in FIG. 18 operates as follows. First of all, the tape in which the audio signal and the data related thereto are already recorded is loaded into the tape recorder 225. In accordance with the operation program 161, the computer 159 instructs the tape recorder 225 to start through the interface 295 and the decoder 313.

The output signals 283 and 297 carry the reproduced signals from the first and second channels, respectively. The low-pass filter 285 has the same characteristics as the characteristic of the low-pass filter 207 in FIG. 16 and passes only the audio signal component therethrough. The filtered signal is applied to the analog-to-digital converter 153. Said band-pass filter 287 is a kind of resonant circuit having a center frequency of 10.5 KHz. Only the sinusoidal wave is 10.5 KHz passes through said filter 287 and serves as a timing clock signal of the analog-to-digital converter 153. The output signal 289 from the converter 153 is the digital signal having a binary signal with eight bits. Since the data unit processed in the computer 159 is the binary signal having 16 bits, the binary signal from the converter 153 is temporarily stored in the register 291 so as to form a signal of 16 bits corresponding to two samples, which is transferred to the computer 159 via the gate circuit 293 and the interface 295. In order to produce the timing signal for controlling the gate circuit 293, the second output signal 315 from the analog-to-digital converter 153 is applied to said flag circuit 311 which interrupts the computer 159 through the interface 295 in such a way that the decoder 313 produces a gate pulse 317 which controls the gate circuit 293. The internal memory of the computer 159 is fully stored, the stored content is further transferred to the disc pack memory 157, and thereafter the computer is available for recording the following digital data converted from the analog signal. Prior to this analog-to-digital conversion, the number of the audio material is discriminated. That is to say, the multi-frequency signal in the form of frequency division multiplex is extracted by the band-pass filters 299 and 301 and then the signal of number 10 in the Table 2 located in front and in the rear of the number of the audio material is detected by producing output signals from the two of said seven resonant circuits in the filter 299, i.e. the resonant circuits having resonant frequencies of 1.3 KHz and 2.5 KHz. These two output signals corresponding to 1.3 KHz and 2.5 KHz are applied to the decoder 303 in which the signal of number 10, i.e. the instruction "the following signal is the number of the audio material" is detected and interrupts the computer 159 through the flag circuit 311. Then, the three digits of the material number shown in FIG. 17e are detected by the decoder 303 through the filter 299 and then stored in the register 305. When the gate circuit 307 receives the readout instruction from the decoder 313, the gate circuit 307 passes said three digits of the material number in the register 305 to the computer 159 in which the number of the audio material is registered. During the above processing, the band-pass filter 301 produces the output signal only from one of two resonant circuits (i.e. 14.5 KHz resonant circuit). This output signal is recorded with the timing shown in FIG. 17d so that this signal is used for representing not the audio signal period but the controlling data part. Said start-stop decision circuit 309 detects the relevant signal and thereafter interrupts the flag circuit 311 in such a way that said circuit 311 operates so as to read out the number of the audio material. The output signal from the other resonant circuit (i.e. 9.7 KHz) occurs during the audio period and interrupts the flag circuit 311 so as to start the analog-to-digital conversion.

After completion of said conversion, the output signal is again produced from said 14.5 KHz resonant circuit and stops the operation of said conversion, and then the multi-frequency signal representative of the time duration of the audio period is read out by the filter 299 and the decoder 303. The multi-frequency signal in this time position has six frequencies corresponding to six digits in which the first and the last digits indicate the signal of number 11 in the Table 2. This number 11 represents that the four digits between the first and the last digits correspond to the time duration of the recorded audio period. As a result, the filter 299 produces two signals from the 1.3 KHz and 4.3 KHz resonant circuits. These signals are decoded by the decoder 303 and send a flag to the flag circuit 311 so as to instruct the computer 159 to initiate the detection of the time duration of the audio period. Then, the remaining four digits of the multi-frequency signal are sequentially detected and stored into the register 305. The stored signals are transferred to the computer 159 through the gate circuit 307 which gate is opened by the timing instruction from the decoder 313.

The above process is repeated every audio material, so that the whole audio information in a series of programs is stored in the disc pack memory 157.

To what position of the disc pack memory 157 each audio material is allocated is previously stored by detecting the time duration of the relevant audio material and by providing the address portion corresponding to that time duration on the disc pack 157.

That is to say, an allocation table is previously tabulated between the material number and the disc pack address. The audio materials are rearranged to record on the disc pack 157 in accordance with the material sequence designated by said allocation table, even if the sequence of the material number is not coincident with the recording order on the tape recorder 225. This way of allocation also has a following advantage. Even if there is an error when recording the material on the tape recorder 225, the erroneous part is left as it is, and the material is correctly recorded on the other part, so that the corrected recording part is available.

An example of the allocation table will be shown in the following Table 3.

Table 3

| Audio Material No. | Start | | | | | | | End | | | | | | |
|---|---|---|---|---|---|---|---|---|---|---|---|---|---|---|
| | Pack No. | Cylinder address | Track address | Sector No. | Word No. | MF | VAF | Pack No. | Cylinder address | Track address | Sector No. | Word No. | MF | VAF |
| 1 | 0 | 0 | 0 | 0 | 0 | 0 | 0 | 0 | 22 | 3 | 2 | 83 | 1 | 1 |
| 2 | 0 | 22 | 3 | 2 | 84 | 1 | 2 | 0 | 57 | 2 | 9 | 96 | 2 | 27 |
| 3 | 0 | 57 | 2 | 9 | 97 | 2 | 28 | 0 | 73 | 0 | 5 | 99 | 3 | 30 |
| 4 | 0 | 73 | 0 | 6 | 00 | 3 | 31 | 0 | 98 | 2 | 13 | 18 | 22 | 7 |
| . | | | | | | | | | | | | | | |
| i | 0 | 188 | 1 | 12 | 23 | 44 | 48 | 1 | 16 | 3 | 3 | 74 | 45 | 3 |
| j | 1 | 16 | 3 | 3 | 74 | 45 | 4 | 1 | 25 | 1 | 8 | 35 | 48 | 18 |
| . | | | | | | | | | | | | | | |
| n-2 | 1 | 43 | 3 | 15 | 66 | 56 | 12 | 1 | 69 | 1 | 0 | 46 | 60 | 47 |
| n-1 | 1 | 69 | 1 | 0 | 47 | 60 | 48 | 1 | 158 | 2 | 4 | 9 | 93 | 24 |
| n | 1 | 158 | 2 | 4 | 10 | 93 | 25 | 1 | 199 | 3 | 15 | 99 | 95 | 49 |

This Table 3 is further illustrated in FIG. 19a, in which the address of the disc pack memory 157 is sequentially developed along a line and triangular marks in FIG. 19a represent the starting and ending points of each audio material. The total length of the line is determined by the memory capacity of the disc pack 157. In case of the signal transmission system, in which 96 channels of transmission lines are used by repeating every five seconds such as the example of the still picture transmission system of FIGS. 1a–1c, the total time length is restricted to 480 seconds.

FIG. 19b illustrates this total time length of 480 seconds which is divided every 5 seconds to form the master frame $MF_0$, $MF_1$, ..., $MF_{95}$. Comparing these master frames with the audio materials in FIG. 19a, the address of the disc pack memory 157 is determined so as to correspond to the number of the specific master frame.

In the still picture transmission system described above, the total audio signal is separated into a series of master frames of 5 seconds which are rearranged in parallel as shown in FIG. 19c and which are transmitted through 96 transmitting channels with repetition every 5 seconds. FIG. 19c illustrates a plurality of parallel channels which correspond to the address of the disc pack memory 157. On each transmitting channel, respective materials are arranged as shown in FIG. 19j which is a magnified drawing of FIG. 19c.

The following signal processing can easily be understood by the form shown in FIG. 19j in which the content of the disc pack memory 157 is separated into the parallel transmitting channels instead of the form shown in FIG. 19a in which the content is dealt with in the sequence of address as it is.

FIG. 20 illustrates a block diagram of the apparatus for controlling the signal arrangement conversion memory 163 (in FIG. 13) so as to multiplex the signal stored in the digital memory 157 in accordance with the signal formation shown in FIGS. 1 and 5. In other words, the apparatus of FIG. 20 transfers the signals from the disc pack memory 157 to the high speed disc recorder 167 according to the signal transmission form of FIGS. 1 and 5.

In FIG. 20, the digital signal which is read out on the disc pack memory 157 through the computer 159 is applied to a gate circuit 319 which passes two samples, i.e. 16 bits of said digital signal. The digital signal from the computer 159 is also applied to a gate circuit 321 which passes the data having 15 bits and for deciding the address of an auxiliary memory 323. Said data is stored in a register 325 having a counting function. This register 325 is named a memory address. The reference numeral 327 denotes a flip-flop for automatically setting the address when the data is written in the auxiliary memory 323. The signal 329 representative of the completion of the data to be written in the auxiliary memory 323 is applied to an AND gate 331 to which the output signal from the flip-flop is also applied. Said signal 329 passes through the AND gate 331 when the flip-flop produces its output signal. The auxiliary memory 323 is operative to store the data temporarily so as to convert the arrangement of the signal stored in the disc pack memory 157 to the signal arrangement of the high speed disc recorder 167. The memory 323 may be composed of a core memory. The auxiliary memory 323 is to be called an allocator. The reference numeral 333 denotes a flip-flop for indicating the condition in which the signal is read out of the allocator 323. The reference numerals 335 and 337 denote AND gates. The reference numerals 339 and 341 denote a 1/8 counter and 18-bit shift register, respectively. The reference numeral 343 denotes an exclusive OR circuit for converting a binary code to a Gray binary code when converting a two-level code to a four-level code. The reference numeral 345 denotes a circuit for combining two two-level signals so as to form a four-level signal. The reference numeral 347 denotes a generator for generating the synchronizing signal which serves as a clock pulse applied to said register 341 and the counter 339. The reference numeral 349 denotes an OR gate for producing the timing pulses by which the data are read out the allocator 323. The high speed disc recorder 167 is a conventional one such as serving for slow-motion television.

The apparatus shown in FIG. 20 operates as follows. The data corresponding to one rotation of the high speed disc recorder 167 (it takes 1/60 second=one television field during said one rotation) are read out from the disc pack memory 157. The data thus read out are applied to the allocator 323 in which the data are rearranged in accordance with the specific sequence so as to store them. Then the data thus allocated are written in one track of the high speed disc recorder 167. The above procedure is repeated so as to transfer all of the data to the high speed disc recorder 167.

FIG. 19d shows the detail of one master frame MF having five sub-frames SF shown in FIG. 19j. This detailed signal arrangement has already been described with reference to FIGS. 1a–1c. FIG. 19e shows the arrangement of one sub-frame SF having 10 video-audio frames VAF shown in FIG. 19d. FIG. 19f shows the construction of one video-audio frame VAF having one video frame VF and two audio frames $A_1F$ and $A_2F$ shown in FIG. 19e. Said high speed disc recorder records the video and audio signals in the order shown in FIG. 19f, i.e., VF   $A_1F$   $A_2F$   VF   ... FIG. 19g shows the formation of one television frame, i.e. video frame VF or audio frame $A_1F$ or $A_2F$ shown in FIG. 19f. Said audio frame $A_1F$ or $A_2F$ has a time duration equal to one frame period of television signal, and the sampling frequency of the audio signal is determined to be $(3/2)f_h$ (wherein $f_h$ is a television horizontal synchronizing frequency, i.e. $f_h \approx 15.75$ KHz, so that $(3/2)f_h \approx 10.5$ KHz). Accordingly, there are 350 samples in one television field, so that there are 350 PCM frames in one audio frame $A_1F$ or $A_2F$, in the case of the PCM signal. As mentioned above, the allocator 323 stores the signal during one television field (a half of one television frame), so that each one of the television frame has 175 PCM frames.

The content of one PCM frame is shown in FIG. 19h. One PCM frame has 12 time slots of PCM frame synchronization and 144 time slots of PCM words $PWD_0 - PWD_{143}$. There are 156 time slots in one PCM frame. FIG. 19i shows the PCM words $PWD_0 - PWD_6$ in FIG. 19h.

FIG. 20 illustrates a detailed embodiment of the process in which the data during one field in FIG. 19g are transferred to the high speed disc recorder 167. This process will be explained in the following.

In order to write the data in the allocator 323, the computer 159 transfers the writing-in instruction to the IOC instruction decoder 313 which decodes the instruction so as to produce a trigger pulse 351. This trigger pulse 351 sets the flip-flop 327 in the writing-in condition. Then the decoder 313 produces a gate pulse 353 which is applied to the gate circuit 321 so as to pass the address data from the computer 159 to the memory address 325. The memory address 325 is set to the content corresponding to that address data. After this setting, the audio data transferred from the disc pack 157 via the computer 159 are passed through the gate circuit 319 by the gate pulse 355 from the decoder 313 so as to write the gated output signal 357 in the allocator 323. After completion of writing in the audio data, the allocator 323 produces the end signal 329 which is applied to the AND gate 331. This AND gate 331 also receives the flip-flop output signal 359 from the flip-flop 327, and the AND output signal from this gate 331 progresses the address of the memory address 325 by 78 steps, the reason of which will be explained later. The following data is written in this new address of the allocator 323 through the gate circuit 319. In such a way the data during one television field are written in the allocator 323.

To which address of the allocator 323 the data from a given address of the disc pack 157 are to be transferred is designated by the operation program 161. This designation depends on the signal transmission system to be applied. This system has already been explained by referring to FIG. 19e. Here, this system will be explained with reference to FIGS. 19h and 19j.

PCMI and PCMII in FIG. 1e correspond to the even master frames $MF_0$, $MF_2$, . . . and the odd master frames $MF_1$, $MF_3$, ..., respectively. When PCMI and PCMII correspond to the master frames $MF_0$ and $MF_1$, respectively, the signals in respective channels A, B and C are allotted to the time slots $PWD_0$, $PWD_1$ and $PWD_2$ in FIG. 19h or 19i, respectively. In such a way, the signals from the master frames $MF_2$ and $MF_3$ are allotted to the time slots $PWD_3$, $PWD_4$ and $PWD_5$, $MF_4$ and $MF_5$ to $PWD_6$, $PWD_7$ and $PWD_8$, respectively. During the first audio frame $A_1F$ of the signal B, the $B_1$ signal from PCMI is allotted to the time slots $PWD_1$, $PWD_4$ and $PWD_6$, and during the second audio frame $A_2F$ of the signal B, the $B_2$ signal from the PCMII (i.e. the master frames $MF_1$, $MF_3$ and $MF_5$) is allotted to the time slots $PWD_1$, $PWD_4$ and $PWD_6$.

The transformation unit from the disc pack 157 to the allocator 323 is the PWD unit in FIG. 19h. As shown in FIG. 19g, the allocator 323 has 175 PCM frames, so that 175 data of $PWD_0$ in the first master frame $MF_0$ (one data has eight bits) are read out the disc pack 157 and are contained in the corresponding address in the allocator 323. The address corresponding to the same time slot in the allocator 323 are cyclically repeated, as shown in FIGS. 19g and 19h, so that the respective time slots $PWD_0$ are arranged every 157 time slots if the address of the first one of the time slots $PWD_0$ is determined. There are eight bits of data in one time slot, whereas the allocator 323 allocates one word, which is a data unit designated by one address, every 16 bits, so that it is possible to contain the data into the time slots $PWD_0$ in respective PCM frames by progressing the address of the memory address 325 by (156/2)=78 steps, as mentioned above. This is the reason why the address of the memory address 325 is stepped progressively by 78 after completion of writing in.

The same is applicable to the following time slot $PWD_1$. The address of the allocator 323 is sequentially shifted by 78 steps from the initial address which is different from that of the time slot $PWD_0$ by one, and the data are sequentially stored in the corresponding addresses. The data written in the allocator 323 are read out of the disc pack 157 in a manner mentioned below. The data of the master frame $MF_0$ which is located after 2/30 second from the data in the time slots $PWD_0$ of the same master frame $MF_0$ are contained in the time slots $PWD_1$ in accordance with the relation between the A and $B_1$ signals in FIG. 1e.

Accordingly, in the time slots $TWD_0$ the 175 words of data during the first 1/60 second (i.e. during one television field) which is obtained by dividing the data during 1/10 second corresponding to the video-audio frame $VAF_0$ in the master frame $MF_0$ to six signal sections are contained, while in the following time slots $PWD_1$ the data during the fifth 1/60 second is obtained by said division. Further, in case of $PWD_1$, the time slots $PWD_1$ contain only two data during the 1/60 second corresponding to the audio frame $A_1F$ in the master frame $MF_0$ (i.e. two data during the fifth and the sixth 1/60 second portions), while the audio frame $A_1F$ contains the fifth and the sixth data obtained by dividing the master frame $MF_1$ into six sections, the same as the case of the master frame $MF_0$.

Relating to the time slots $PWD_2$ 175 words of the data of the master frame $MF_1$ are transferred to the allocator 323, which is quite similar to the time slot $PWD_0$.

The same processing is sequentially applied to every master frame. For example, the contents of the master frames $MF_2$ and $MF_3$ are sequentially contained in the time slots $PWD_3$, $PWD_4$ aND $PWD_5$, ..., and the contents of the master frames $MF_{94}$ and $MF_{95}$ are contained in the time slots $PWD_{141}$, $PWD_{142}$ and $PWD_{143}$. Then, all the audio data portions ($PWD_0$–$PWD_{143}$) of the allocator 323 are filled. The remaining portion of the allocator 323 is for the PCM frame synchronization as shown in FIG. 19h. In this portion it is necessary to insert a signal having a regular pattern, so that the result is calculated by the computer 159 in accordance with the data and the operation instruction from the operation program 161 without using the disc pack memory 157.

In such a manner the data are fully stored in the allocator 323, and thereafter the stored data are transferred to the high speed disc recorder 167. Here, this transferring operation will be explained.

After completion of writing in the allocator 323, the IOC instruction decoder 313 produces a reset pulse 361 which resets the flip-flop 327 so as to make the allocator 323 ready for reading out. Then the decoder 313 generates a start-of-reading-out signal 363 which sets the flip-flop 333. As a result, the AND gates 335 and 337 are opened. That is, the clock pulse (6.54 MHz) from the synchronizing signal generator 347 passes through the AND gate 337 so as to trigger the 1/8 counter 339. The output signal from the 1/8 counter 339 increases the address data by one in the memory address 325. Prior to this modification of address data, the first address for reading out the allocator 323 is previously set in the memory address through the gate circuit 321 by the computer 159.

The reading-out cycle of the allocator 323 is started by the output signal 365 from the IOC instruction decoder 313. The first one word having 16 bits is stored in the shift register 341 through the AND gate 335. The shift register 341 is composed of two sections, each of which contains eight bits. This register 341 stores the data having 16 bits after distinguishing between the odd and the even data. The reason why the signal arrangement is modified is that it is necessary to use both of the odd data and the following even data as two two-level signals when two two-level signals are converted into one four-level signal by the two-four level converter 345.

It is necessary to provide the logic circuit 343 to eliminate any code error in case of converting two two-level signals to one four-level signal. The logic circuit 343 converts natural binary code to Gray binary code. The detailed construction of the two-four level converter 345 is omitted here.

The output signal of the counter 339, which receives the clock pulse from the synchronizing signal generator 347, is applied to the OR gate 349 which produces a logical OR pulse between said signal from the counter 339 and the signal 365 from the decoder 313. The data stored in the allocator 323 are sequentially read thereout and further written in the shift register 341 in parallel. During this writing-in cycle, said data are serially read out one after another and transferred to the exclusive OR circuit 343 and the following converter 345. The clock pulse for reading out the register 341 is a 6.552 MHz pulse passed through the AND gate 337 from the generator 347, the same as the clock pulse applied to the counter 339.

The four-level audio PCM signal formed by the converter 345 is recorded on the high speed disc recorder 167. There are many tracks in this recorder 167, so that it is necessary to select the track on which the relevant signal is to be recorded. This selection of track is previously instructed by the computer 159, and the disc recorder 167 is already ready for recording. Such kind of recorder applicable to said recorder 167 is put on the market and can easily be obtained, so that the detail thereof is omitted in this specification.

When the recording into the disc recorder 167 is finished, the high speed disc recorder 167 produces a stop pulse 367 which resets the flip-flop 333 so as to stop reading out the allocator 323.

As mentioned above, the data during the first television field shown in FIG. 19g has been recorded, that is to say, the data has been transferred from the disc pack 157 to the high speed disc memory 167. Then the same data processing is applied to the data during the second field in FIG. 19g. When this data of the second field is completely recorded on the high speed disc recorder 167, then the recording of the audio frame $A_1F$ in FIG. 19f is completed.

The same processing is applied to the data of the audio frame $A_2F$ except that during the $A_2F$ period the data in the master frame $MF_1$, $MF_3$, $MF_5$, ... $MF_{95}$ are written in the time slots $PWD_1$, $PWD_4$, $PWD_6$, ... $PWD_{142}$, whereas during the $A_1F$ period the data in the master frame $MF_0$, $MF_2$, $MF_4$, ..., $MF_{94}$ are written in the time slots $PWD_1$, $PWD_4$, $PWD_6$, ..., $PWD_{142}$.

When the above processing is completed, the data during the first video-audio frame $VAF_0$ are transferred to the high speed disc recorder 167 from the disc pack memory 157. The sample is repeatedly applied to the sequential video-audio frames $VAF_1$, ..., $VAF_9$. Since four tracks are required for one video-audio frame VAF in the high speed disc recorder 167, 200 tracks are required for 10 video-audio frames in total. In addition, in case of recording 50 pictures, 100 tracks are required for 50 pictures because two tracks are required for one picture. Accordingly, it is necessary that the high speed disc recorder 167 has 300 tracks in total in order to use this recorder 167 in the still picture transmission system described in the preamble. There is a high speed disc recorder on the market which has 1800 tracks, so that this recorder can contain six sets of programs having the described data formation.

After the whole still picture signal inclusive of video and audio signals has been recorded, an information according to the still picture transmission system can be obtained by reproducing the high speed disc recorder 167 in the sequence of the recorded tracks.

In the above embodiment of the editing apparatus according to the invention shown in FIG. 13, the audio signal is processed by the computer 159. On the other hand, if the high speed memory 167 has so large a capacity that the memory 167 can store not only a given transmitting signal but also the data to be contained in the large capacity memory 157, then the memory 157 can be eliminated.

An embodiment of the editing apparatus according to the invention in which said memory 157 is eliminated will be explained hereinafter with reference to FIG. 21. In FIG. 21, the same components are denoted by the corresponding numerals in FIG. 13. The analog audio input signal 151 is converted to the digital signal 155 by the analog-to-digital converter 153. This digital signal 155 is stored in the signal arrangement conversion memory 163 via the computer 159. If the stored signal reaches a given quantity, the stored signal is sequentially recorded on given track groups of a video disc recorder 369 having such large capacity as mentioned above. After containing the whole audio signal to be multiplexed in the video disc recorder 369, the digital information of the audio signal is edited and processed by the operation program 161 which gives instruction to the computer 159 so as to interpolate a portion for the video signal transmission period in said audio signal. For that purpose, the whole audio signal stored in the video disc recorder 369 is reproduced. The reproduced signal 169 is applied to a PCM decoder 371 by which said signal 169 is decoded to the digital information of the audio signal. The decoded digital information is transferred to a control circuit 373 in which only the information composing time duration of one television field in the whole period of the transmitting signal is extracted and further transferred to the computer 159. Under the control of operating program 161, the computer 159 rearranges said digital information in accordance with the digital information arrangement forming one television field of the transmitting signal in the arrangement conversion memory 163. After containing one field of said signal arrangement in the arrangement conversion memory 163, the contained signal is recorded on a given track for recording a transmitting signal in the video disc recorder 369. By repeating the above processing, the audio signal during all of the audio signal transmitting period can be sequentially edited. Relating to the video signal transmitting period, the respective video signals are recorded on the specific track every one frame. Then, the whole transmitting signal is completely composed.

Next the operation of the apparatus shown in FIG. 21 will be explained in the following. The audio signal 151 applied to the analog-to-digital converter 153 has a time duration equal to 480 seconds, as already explained with reference to FIGS. 14 and 15. The analog audio signal 151 is sequentially applied to the converter 153 as a plurality of channels of audio signals, as shown in FIG. 15b. In the converter 153, this analog signal 151 is sampled by the sampling pulse having the sampling frequency 10.5 KHz so as to convert it to the digital signal. That is to say, every sample of the audio signal is quantized so as to be converted into the digital signal having eight bits. The eight-bit signal corresponding to every two samples is grouped to one word which is sequentially contained in the arrangement conversion memory 163 via the computer 159. The reason why the eight-bit signal is grouped to one word every two samples is that one word has 16 bits in the computer 159 and the memory 163 in this embodiment and that the data is transferred every one word. In the memory 163 the data are arranged in accordance with the order of the output signals to be transferred. Further, in the first six words, i.e. 96 bits of the memory address, a synchronization information content which is same as that in the former embodiment, as shown in FIG. 19h, is contained. From the seventh word on, 72 words of the digital signal, each having the content of said two samples, are sequentially arranged and thereafter six words of the synchronizing information and 72 words of the digital audio signal are again arranged. Such an arrangement is repeated 175 times, since one PCM frame period of the transmitting signal during the audio transmission period has 156 PCM words, of which the first twelve PCM words contain synchronizing information and the remaining 144 PCM words contain audio information. Here, one PCM word transmits one sample information and contains four four-level signals. In case of representing these signals by word unit, in which one word has two PCM words, 156 PCM words transmit 78 words in which the first six words contain the digital signal of synchronization information and the remaining 72 words contain the digital audio signal.

In the video disc recorder 369, the recorded signal is transferred every one field which has 175 PCM frames, so that the required memory capacity of the arrangement conversion memory 163 is 13.65 kilo words as mentioned above. In this embodiment (FIG. 21), the memory 163 is composed of a 16 kilo-word memory having four-kilo-word memories. As to digital information during this processing, every PCM frame has 144 samples and one field contains 175 PCM frames, so that the digital signal during 144 fields corresponds to the audio signal during 2.4 seconds.

After completion of information allocation in the memory 163, the stored signal is sequentially read out of the memory 163 every one word in accordance with the writing order by the pulse having a frequency of 819 KHz which is one eighth of the frequency 6,552 KHz produced from the synchronizing signal generator 347. The read-out signal is converted to two two-level signal series and then limited in its pass band for the purpose of wave shaping. The output signal 165 thus obtained from the arrangement conversion memory 163 is recorded on the video disc recorder 369. The above processing is controlled by the computer 159 to which operation instructions are given from the operating program 161. On the other hand, the video disc recorder 369 in FIG. 21 has memory capacity corresponding to 1800 tracks. In this recorder 369, 300 tracks for recording the transmitting signal and 200 tracks for editing the audio signal are previously assigned.

Thus, the audio signal is sequentially processed to be recorded on the video disc recorder 369 every 2.4 seconds, and accordingly the audio signal during 480 seconds are accommodated in 200 tracks. It takes 1/30 second to transfer data from the arrangement conversion memory 163 to the video disc recorder 369, i.e. 1/60 second for transferring time and a maximum 1/60 second for waiting time of rotation. During this 1/30 second 175 words of digital information are produced by AD conversion of 350 samples, but there occur some cases in which all of this 175 words cannot be accommodated in said memory 163. In such a case the memory in the computer 159 is suitably used as a buffer for temporarily storing the overflown data. As a result, it takes about 480 seconds to convert the analog audio signal during 480 seconds to the digital audio signal and to store said digital audio signal on the 200 tracks of the video disc recorder 369.

The address of said digital signal is allotted to every track in accordance with the order of sampling, while every track is divided into 175 PCM frames, each of which has 144 samples. There is a synchronization information in every PCM frame, and the address of every information is identified by track, synchronization information and counting of PCM word, so that the transmitting signal corresponds to the analog audio signal completely.

Next, the transmitting signal is edited and processed. The signal in the first field of the audio transmission period is composed of a digital information formed by editing and rearranging the digital signal having 175 samples corresponding to the respective samples (from 0 to 174) in every master frame $MF_0$–$MF_{95}$ in the audio signal of 480 seconds, and 175 samples corresponding to the samples (from 700 to 874) in every even master frame $MF_0$, $MF_2$, . . ., $MF_{94}$, as clearly explained by the above description about FIGS. 14 and 15.

The data on the track for editing the audio signal are sequentially reproduced by the video disc recorder 369. That is to say, the data corresponding to 350 samples are extracted from even tracks and the data corresponding to 175 samples are extracted from odd tracks. The information thus extracted is edited and reallocated on the memory 163. For performing this operation, the reproduced output signal of the video disc recorder 369 is applied to the PCM decoder 371 in which the four-level signal is sequentially identified from the first sample of each track so as to reproduce two two-level series. One word information can be reproduced by repeating this editing processing eight times. This processing is controlled by the controller circuit 373 under control of the computer 159 so as to allot only desired information in the memory 163 in accordance with the required signal arrangement of the transmitting signal. More in detail, relating to the output signal from the zeroth track containing the audio signal during the first 2.4 seconds, 72 words of the first PCM frame except for the synchronizing information portion and the first 16 words of the similar 72 words in the following PCM frame, i.e. 88 words in total are extracted, and 175 samples corresponding to 87.5 words, in which the latter half of the last one word is deleted, are used. In the zeroth track, 87.5 words corresponding to 175 PCM words from the 125th PCM word in the fourth PCM frame to the 140th PCM word in the fifth PCM frame except for synchronizing information are extracted. The content on the even tracks corresponding to the master frames $MF_2$, $MF_4$, . . . , $MF_{94}$ is similarly extracted. Relating to the content on the odd tracks corresponding to the master frames $MF_1$, $MF_3$, . . ., $MF_{95}$, 72 words of the whole information except for synchronizing information in the first PCM frame and 15.5 words of the second PCM frame are extracted. In the whole 175 PCM frames, 12.6 kilo-words of total data serve for data in the first field, and 1.05 kilo words of synchronizing information, of which each PCM frame has six words, are produced by the computer 159, so that as mentioned above 13.65 kilo words of total data are rearranged in the arrangement conversion memory 163. The maximum data which is extracted from every track containing audio signals during 2.4 seconds is 172 words. This data is produced every 1/60 second, i.e. 16.7 msec. This extracted data is contained in the first audio transmitting track among tracks for recording the transmitting signal. The data is rearranged in the following manner by the program instruction under the control of the computer 159.

The 175 samples of data corresponding to each sample extracted from the first 2.4 seconds of signal in the first (zeroth) track are recorded as follows. In accordance with the address sequence depending on the order of the word read out of the memory 163, the first six words contain synchronizing information and one half of the first word of 72 words following said six words contains the information corresponding to the first sample, and then the second six words following said 72 words contain the synchronizing portion and one half of the following word contains the information corresponding to the second sample. In this way, 175 samples of information are repeatedly recorded every 78 words within 16.7 msec. As the zeroth track is an even track, 175 samples from the 701st to 875th samples are recorded in the latter half of one word following said six words of synchronization information. Next, the second master frame $MF_1$ is an odd frame, and 175 samples are extracted from the data in the second master frame. The extracted data is stored in one half of the second word following said six words of synchronizing information in a same manner as mentioned above. In this way, the content of said memory 163 is sequentially edited. When the content of the memory 163 is edited and said 13.65 kilo-words are completely stored, the recording timing of the video disc recorder 369 is synchronized with the memory 163. After this synchronism is performed, data in the word unit are sequentially read out of the memory 163 by a signal having a frequency equal to one eighth of 6,552 KHz supplied from the synchronizing signal generator so as to produce two two-level signal series, which are combined to a four-level signal every 6,552 KHz. This four-level signal is recorded on said tracks of the video disc recorder 369 after band limitation.

FIG. 22 shows an actual construction of an embodiment of the audio signal editing and processing apparatus according to this invention. By referring to FIG. 22, the practical processing in the editing apparatus according to the invention will be explained. FIG. 22 corresponds to FIG. 21 and the same numerals are used for corresponding portions. In FIG. 22, the reference numeral 375 denotes an amplifier, 377 a counter, 379 a memory and 381 a buffer. The computer 159 has two input circuits 383 and 385 and two output circuits 387 and 389. The reference numerals 391 and 393 denote buffer memories and 395 an electronic switch. The arrangement conversion memory 163 has an input circuit 397 and input/output channel 399. The reference numeral 401 denotes an address counter, 403 and 405 shift registers, 407 and 409 current conversion circuit, 411 an adding circuit, 413 a synchronizing signal generator, 415 and 417 shift registers and 419 a memory.

The audio signal 151 is applied to the amplifier 375 via the input terminal. The amplifier 375 has a sampling filter, i.e. a high interrupt filter having a cut-off frequency of about 5 KHz. The band width of said audio signal 151 is limited by said filter and thereafter the filtered output is amplified to the input level of the analog-to-digital converter 153. This converter 153 receives a conversion trigger pulse of 10.5 KHz from the generator 413 via a signal line 421 so as to convert the input audio signal to the digital output signal in which audio information is quantized in the form of eight bits. Soon after completion of this conversion, an end signal representative of termination of conversion is applied to the counter 377 via a signal line 423. In the computer 159, one word has 16 bits, so that in order to use the memory with high efficiency, it is necessary that two samples of audio information form one word.

For this purpose, the end signal on the signal line 423 is applied to the counter 377 so as to obtain a frequency equal to one half of its frequency by frequency division. By this frequency-divided signal 425, the digital signal from the analog-to-digital converter 153 is written in the eight-bit memory 379 every two samples. Said digital signal is also applied to the buffer 381. The output signals from the memory 379 and the buffer 381 are respectively applied to the input circuit 383 of the computer 159. Said counter 377 produces an output signal 427 which has opposite polarity to the output signal 425. This signal 427 is applied to the input circuit 383 so as to interrupt input data every two samples of audio information. That is to say, eight bits of audio information converted every 10.5 KHz is contained in the buffer memory every two times, so that this audio information in parallel with the other eight bits of audio information forms 16 bits in total. The 16 bits of digital signal corresponding to two samples and applied to said input circuit 383 are transferred to the two buffer sections 391 and 393 of the buffer memory, in which one word has 16 bits, via the input/output channel 387 of the computer 159. The buffer memory is divided into two sections 391 and 393 each having eight bits. The electronic switch 395 selects the necessary data in either one of said two sections and the selected data is applied to the input circuit 397 of the arrangement conversion memory 163 in which the digital audio signal corresponding to 2.4 seconds is sequentially stored as mentioned above. After completion of arranging said information in the memory 163, if the address counter 401 receives an end signal representative of said completion from the computer 159 via an output line 429 and a field synchronizing pulse 431 from the synchronizing signal generator 413, then said address counter 401 starts its counting in such a way that count one is produced by counting eight pulses of bit clocks 433 (6.552 MHz) which are also applied to the address counter 401. The memory 163 is read by a read-out trigger pulse 435 derived from the address counter 401 so as to sequentially produce a read-out signal every one word from the input/output channel 399 in the order of storage. This read-out signal is written in the two registers 403 and 405 by the trigger signal 437. These registers 403 and 405 are shift registers in the form of parallel inputs and serial outputs. The content of the registers 403 and 405 is sequentially shifted by said bit clock 433 (6.552 MHz) supplied from the synchronizing signal generator 413 and is sequentially applied to signal lines 439 and 441 as two two-level signal series. These two signal series are converted to current signals by the current conversion circuit 407 and 409. Here, if the current value derived from the circuit 407 is twice that derived from the circuit 409, then the four-level siganl can be obtained by adding these current values. This addition is processed by the adder 411.

It is necessary to add a synchronizing signal portion to the four-level signal thus converted. This addition can be performed by applying a synchronizing signal 443 from said generator 413 to the adder 411. The added output signal 165 is applied to the video disc recorder 369.

The above operation is controlled by the computer 159 which is controlled by the operating program 161.

In such a way, the digital signal is divided into tracks in accordance with the sampling order. Each track contains 175 PCM frames, in each of which 144 samples are contained. Further every PCM frame has synchronizing information. The address of each information is identified by track, synchronizing information and counting of PCM word, so that the transmitting signal is maintained to correspond to said audio signal completely. Then, in order to edit said digital data so as to conform to the signal arrangement of the transmitting signal, these data are reproduced sequentially by the video disc recorder 369, and then the four-level signal is sequentially detected from the top of each track by the PCM decoder 371 so as to reproduce two two-level signal series. After repeating this reproducing process eight times, one word of information is reproduced. This reproduced information is applied to the shift registers 415 and 417, each of which is an eight-bit shift register in the form of parallel inputs and serial outputs. In these shift registers, the reproduced information is sequentially shifted by the bit clock 433 (6.552 MHz) applied thereto from the synchronizing signal generator 413. The output signals from the shift registers 415 and 417 are written in the memory 419 in the form of serial 16 bits. This written-in signal is sequentially read out the memory 419 by a pulse 445 having one eighth frequency of said bit clock 433 obtained from a ⅛ frequency divider 447. The read-out signal from the memory 419 is applied to the computer 159 via the input/output channel 385. The digital signal including the audio information corresponding to one television field which is now being edited by the video disc recorder 369 is transferred to the memory area in the computer 159. The necessary digital signal in that memory area is transferred to the buffer memory having two sections 391 and 393 through the input/output channel 387, and the output signal from said buffer memory is transferred to the input circuit 397 of the arrangement conversion memory 163 via the electronic switch 395.

Further, the computer 159 supplies a memory instruction signal to a control line 449 so as to store one word in said buffer memory. The computer 159 also supplies a control signal for selecting a desired one of two eight-bit samples of the digital signals forming one word and transferred from the computer 159 to a second control line 451. To a third control line 453 an address information for designating a location in said memory 163 in which one given sample of the digital signal from the computer 159 is accommodated is applied by the computer 159.

The arrangement conversion memory 163 contains a given digital audio signal in a magnetic core position corresponding to a desired signal position in the signal arrangement of the transmitting signal in accordance with the received control signals.

Thus, a signal in one television field is arranged by sequentially repeating the above processing. The audio information is automatically arranged or edited on magnetic cores by the instruction from the operating program 161. Here, the digital signal corresponding to the audio information having a time duration of 480 seconds is programmed in a manner that this digital signal corresponds to an address on the transmitting signal, as already explained with reference to FIGS. 14 and 15.

As mentioned above, the digital signal corresponding to a given transmitting signal during one television field is rearranged in the memory 163. The content of said memory 163 is read thereout in a given sequence so as to be converted to a signal corresponding to the transmitting signal which is further recorded on the video disc recorder 369. When the address counter 401 receives the end signal representative of the completion of signal rearrangement in said memory 163 from the computer 159 via the output line 429 and the field synchronizing pulse 431 from said generator 413, the address counter 401 starts its counting and steps one count forwardly by counting eight pulses of bit clocks 433 (6.552 MHz) applied to the address counter 401. On the other hand, in the arrangement conversion memory 163, the content representative of the designated address position is derived from the input/output channel 399 by the read-out trigger pulse 435 occurring simultaneously when the address is modified. This content is stored in the pair of shift registers 403 and 405 by the trigger signal 437. The content stored in these registers are shifted sequentially by a bit clock 455 supplied from the synchronizing signal generator 413 so as to be applied to the signal lines 439 and 441 as two two-level signal series. These two series of signals are converted to corresponding current values by current conversion circuit 407 and 409, respectively. These two current values are added by the adder circuit 411 so as to form the four-level signal. In the adder circuit 411, the synchronizing signal 443 from the generator 413 is also added to that four-level signal. The added output signal 165 thus obtained is applied to the video disc recorder 369. The recorder 369 receives a signal 457 for designating a recording track from the input/output channel 389 of the computer 159, and then said output signal 165 is sequentially recorded on that designated track.

Instead of adding the digital synchronizing signal and so on in the adding circuit 411, it is also possible to add them in a following way. When editing the audio signal in the arrangement conversion memory 163, such a signal as said synchronizing signal is contained in a given address position in the memory 163 in the form of a digital signal corresponding to a given pattern, and when reading the edited signal out of said memory 163, the edited signal including said relevant signal is sequentially read out of said memory 163 in a manner mentioned above.

If the operation program of the audio signal having a time duration of 480 seconds is previously formed prior to application of the audio signal, the editor apparatus according to this invention can have its converting or editing process mentioned above proceed automatically and can form the transmitting signal on a given track of the video disc recorder 369 sequentially. In addition, if the video signal corresponding to the still picture is recorded on a given track separated from the tracks relating to the audio signal and the synchronizing signal in said video disc recorder 369, the output signal 169 to be transmitted can be repeatedly obtained from the recorder 369 by reproducing the recorder 369 in a repeated mode.

As explained above, if the processing of the audio signal according to this invention is sequentially carried out in accordance with the signal correspondence explained with reference to FIGS. 14 and 15, the transmitting signal relating to the audio signal of 480 seconds can be completely recorded on the tracks corresponding to the audio signal transmission period in the recorder 369.

In the above embodiment of this invention, a minimum number of required tracks, i.e. 200 tracks are used for recording the digital audio signal corresponding to 480 seconds on said recorder 369, but if there are more tracks available for recording in the recorder 369, a desired number of tracks and digital signal arrangement therein can be suitably determined so as to control adequately the program of the audio editing process according to this invention.

Relating to recording of the video signal, a given video signal may be recorded on each track corresponding to the picture transmission period, before or after the above editing process of audio information.

As is clear from the above explanation, the editor apparatus according to this invention does not require any magnetic disc memory apparatus for recording digital information but requires only the arrangement conversion memory 163 and the video disc recorder 369. According to this invention, a digital signal is formed with a NRZ four-level signal so as to be able to use the video disc recorder as a memory apparatus for the digital audio signal, and the audio signal is multiplexed in the form of PCM and limited in its frequency band so as to be easily identified. In addition, the audio information signal is transferred by every unit period such as the field period. Therefore, according to this invention, editing the process of the audio signal can be realized, and the edited signal can be repeatedly transmitted.

We claim:

1. A signal editing and processing apparatus for editing and processing a plurality of continuous signals to be transmitted through a transmission line composed of a plurality of channels, in each of which signal transmission periods and pause periods are provided alternately and have an integer ratio of time duration with each other, and each of said plurality of continuous signals is separately rearranged during said pause periods and repeatedly transmitted, comprising:

an analog-to-digital converter for converting sequentially each of said continuous signals to a digital signal, a first memory being provided with a plurality of memory positions having a respective address determined in accordance with the relevant continuous signal so as to store temporarily all of the digital signals in said memory, means for extracting said digital signals from said first memory and for rearranging said extracted digital signals in order to allot said extracted signals to given time slots of said transmission periods of said channels, a second memory for containing said rearranged digital signals in a plurality of memory positions corresponding sequentially to said given time slots of said transmission periods of said channels, means for reading out the digital signals thus arranged in a given sequence in said second memory with a given speed required for the signal transmission, a third memory for storing sequentially the read-out digital signals, means for reading out said digital signals stored in said third memory with said given speed repeatedly at a given timing required for the signal transmission, and means for multiplexing said digital signals in the form of pulse code modulation signals and for transmitting said digital signals in the form of multilevel signals.

2. An audio signal editing and processing apparatus in a still picture transmission system for transmitting a plurality of continuous audio signals and a plurality of still picture signals, wherein said continuous audio signals are converted in such a manner that the audio signals are provided with signal transmission periods and pause periods having an integer ratio of time duration with each other, both of which are alternately repeated, and said still picture signals are allotted to said pulse periods respectively so as to form a sequential transmission signal accompanied by said audio signals, comprising:

means for inserting digital control signals into said plurality of continuous audio signals for the purpose of identifying and automatically processing said audio signals, an analog-to-digital converter for converting sequentially each of said continuous audio signals to a digital audio signal, a first memory being provided with a plurality of memory positions having a respective address determined in accordance with the relevant audio signals so as to store temporarily all of the digital audio signals and said digital control signals in said memory, means for extracting digital signals which correspond respectively to given signal transmission periods of said audio signals from said stored digital signals, a second memory for containing said extracted digital signals, said extracted digital signals being arranged in a plurality of memory positions corresponding respectively to given signal transmission periods of said audio signals, means for reading out the digital signals thus arranged in a given sequence with a given speed required for the signal transmission, a magnetic disc video recorder for recording the read-out digital signals in said given sequence on a plurality of tracks thereof, and means for reading out the digital signals stored in said recorder with said given speed repeatedly at a given timing required for the signal transmission.

3. An audio signal editing and processing apparatus as claimed in claim 2, wherein said digital signals are multiplexed in the form of pulse coded modulation signals and are transmitted in the form of multilevel signals.

4. An audio signal editing and processing apparatus as claimed in claim 2, wherein said plurality of continuous audio signals are edited so as to be transmitted during said signal transmission periods of said audio signals in such a way that signal parts to be transmitted during said pause periods of said audio signals are recorded on tracks corresponding to said pause periods of said audio signals in said magnetic disc video recorder.

5. A signal editing and processing appartus for editing and processing a plurality of continuous signals to be transmitted through a transmission line composed of a plurality of channels in each of which signal transmission periods and pause periods having an integer ratio of time duration with each other are provided, and each of said plurality of continuous signals is separately reformed in said pause periods and repeatedly transmitted, comprising:

an analog-to-digital converter for converting sequentially each of said continuous signals to a digital coded signal corresponding to said continuous signal, a memory for storing temporarily a given amount of coded signals out of the digital coded signals, means for reading out the coded signals thus stored in said memory with a given speed equal to an integral multiple of the signal transmission speed of the transmitting signal, a magnetic disc video recorder for recording sequentially the read-out coded signals on a plurality of give tracks thereof in such a way that the coded signals corresponding respectively to all of said continuous signals are temporarily recorded on said tracks, means for reproducing said recorded coded signals from said tracks of said disc recorder, means for extracting out of the reproduced coded signals selectively ones required to form respective signal portions having a given unit time period of the transmitting signal, means for writing the extracted coded signals in said memory so as to be arranged in accordance with the signal formation of the transmitting signal, means for reading out the arranged coded signals from said memory with a given speed equal to said signal transmission speed, means for recording sequentially the read-out arranged coded signals on other tracks of said disc recorder in such a way that all of said digital coded signals to be transmitted in said signal transmission periods of said plurality of channels are recorded on a plurality of given tracks of said disc recorder, and means for reproducing said all of said digital coded signals recorded on said plurality of given tracks of said disc recorder with said signal transmission speed repeatedly at a given timing required for the signal transmission.

6. A signal editing and processing appatus as claimed in claim 5, wherein said digital coded signals are multiplexed in the form of pulse coded modulation signals and are transmitted in the form of multilevel signals.

7. A signal editing and processing apparatus as claimed in claim 5, wherein said plurality of continuous signals are edited so as to be transmitted during said signal transmission periods of said channels in such a way that signal parts to be transmitted during said pause periods of said channels are recorded on tracks corresponding to said pause periods of said channels in said magnetic disc video recorder.

8. An audio signal editing and processing apparatus in a still picture transmission system for transmitting a plurality of continuous audio signals and a plurality of still picture signals, wherein said continuous audio signals are converted in a manner that the audio signals are provided with signal transmission periods and pause periods having an integer ratio of time duration with each other, both of which are alternately repeated, and said still picture signals are allotted to said pause periods respectively so as to form a sequential transmitting signal, comprising:

means for inserting digital coded control signals into said plurality of continuous audio signals for the purpose of identifying and automatically processing said audio signals, an analog-to-digital converter for converting sequentially each of said continuous audio signals to a digital coded audio signal in accordance with the signal formation of the transmitting signal, a memory for storing temporarily a given amount of coded signals out of the digital coded signals, means for reading out the coded signals thus stored in said memory with a given speed equal to an integral multiple of the signal transmission speed of the transmitting signal, a magnetic disc video recorder for recording sequentially the read-out coded signals on a plurality of given tracks thereof in such a way that the coded signals corresponding respectively to all of said continuous signals are temporarily recorded on said tracks, means for reproducing said recorded coded signals from said tracks of said video disc recorder, means for extracting out of the reproduced coded signals selectively ones required to form respective signal portions having a given unit time period of the transmitting signal, means for writing the extracted coded signals in said memory so as to be arranged in accordance with the signal formation of the transmitting signal, means for reading out the arranged coded signals from said memory with a given speed equal to said signal transmission speed, means for recording sequentially the read-out arranged coded signals on given other tracks of said disc recorder in such a way that all of said digital coded signals to be transmitted in said signal transmission periods of said plurality of signals are recorded on a plurality of given tracks of said video disc recorder, and means for reproducing said all of said digital coded signals recorded on said plurality of given tracks of said disc recorder with said signal transmission speed repeatedly at a given timing required for the signal transmission.

9. An audio signal editing and processing apparatus as claimed in claim 8, wherein said digital coded signals are multiplexed in the form of pulse coded modulation signals and are transmitted in the form of multi-level signals.

10. An audio signal editing and processing apparatus as claimed in claim 8, wherein said plurality of continuous audio signals are edited so as to be transmitted during said signal transmission periods of said audio signals in such a way that signal parts to be transmitted during said pause periods of said audio signals are recorded on tracks corresponding to said pause periods of said audio signals in said magnetic disc video recorder.

* * * * *